United States Patent
Jain et al.

(10) Patent No.: US 11,032,176 B2
(45) Date of Patent: Jun. 8, 2021

(54) DETERMINING LINK CONDITIONS OF A CLIENT LAN/WAN FROM MEASUREMENT POINT TO CLIENT DEVICES AND APPLICATION SERVERS OF INTEREST

(71) Applicant: Hughes Network Systems, LLC, Germantown, MD (US)

(72) Inventors: Kaustubh Jain, Germantown, MD (US); Chi-Jiun Su, Rockville, MD (US); Nagesh Javali, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 286 days.

(21) Appl. No.: 14/996,187

(22) Filed: Jan. 14, 2016

(65) Prior Publication Data

US 2016/0212031 A1 Jul. 21, 2016

Related U.S. Application Data

(60) Provisional application No. 62/103,562, filed on Jan. 14, 2015.

(51) Int. Cl.
*H04L 12/26* (2006.01)
*H04L 12/24* (2006.01)

(52) U.S. Cl.
CPC ........ *H04L 43/0876* (2013.01); *H04L 41/142* (2013.01); *H04L 43/0864* (2013.01); *H04L 43/0882* (2013.01); *H04L 43/0894* (2013.01)

(58) Field of Classification Search
CPC ... H04B 7/0417; H04B 7/0413; H04J 3/0638; H04L 12/14; H04L 27/26; H04L 41/022;
(Continued)

(56) References Cited

U.S. PATENT DOCUMENTS 6,343,064 B1    1/2002  Jabbarnezhad
7,822,837 B1 *  10/2010 Urban ................ H04L 41/5009
                                                        709/223
(Continued)

OTHER PUBLICATIONS

USPTO, "International Search Report & Written Opinion", PCT/US2016/013491, dated Mar. 17, 2016.
(Continued)

*Primary Examiner* — Nicholas R Taylor
*Assistant Examiner* — Michael Li
(74) *Attorney, Agent, or Firm* — Potomac Technology Law, LLC

(57) ABSTRACT

Approaches for determining link conditions within a client network are provided. Network protocol statistics are recorded for network connections over the client network, wherein each connection provides data communications between a client terminal node and a different respective client device, and the client terminal node provides access to a broadband communications network for each of the different respective client device(s). Connection metrics are determined for each of the network connections, wherein each connection metric is determined based on the network protocol statistics associated with the respective network connection. Diagnoses of network conditions regarding connections over the client network that are of interest, wherein each diagnosis is performed based on an analysis of a respective set of the connection metrics for the respective network connection. Results of each diagnosis are provided to a system operator.

21 Claims, 10 Drawing Sheets

(58) Field of Classification Search
CPC ... H04L 41/142; H04L 41/22; H04L 41/5077; H04L 43/10; H04L 43/08; H04L 43/0864; H04L 43/0876; H04L 43/0882; H04L 43/0894; H04L 45/00; H04L 45/12; H04L 45/28; H04L 45/121; H04L 45/36; H04L 41/5009; H04L 43/00; H04L 43/0852; H04L 63/02; H04L 63/10; H04L 63/102; H04L 67/14; H04L 67/42; H04W 4/02; H04W 28/06; H04W 28/08; H04W 28/18; H04W 52/42; H04W 52/241; H04W 52/265; H04W 88/08; H04W 16/10; H04W 16/14; H04W 16/18; H04W 24/02; H04W 72/04; H04W 72/044; H04W 72/082; H04W 72/085
See application file for complete search history.

(56) References Cited

U.S. PATENT DOCUMENTS

| | | | | |
|---|---|---|---|---|
| 8,451,929 | B2* | 5/2013 | Agee | H04B 7/0413 375/267 |
| 2005/0216729 | A1 | 9/2005 | Joels et al. | |
| 2006/0182034 | A1* | 8/2006 | Klinker | H04L 43/00 370/238 |
| 2008/0052401 | A1* | 2/2008 | Bugenhagen | H04L 12/14 709/227 |
| 2008/0090575 | A1* | 4/2008 | Barak | H04W 16/10 455/444 |
| 2009/0013210 | A1 | 1/2009 | McIntosh et al. | |
| 2012/0176900 | A1* | 7/2012 | Steer | H04L 45/12 370/235 |
| 2014/0259147 | A1* | 9/2014 | L'Heureux | H04L 63/02 726/14 |
| 2014/0269276 | A1 | 9/2014 | Rothstein et al. | |
| 2015/0056960 | A1* | 2/2015 | Egner | H04W 12/08 455/411 |

OTHER PUBLICATIONS

"AirMagnet WiFi Analyzer", Fluke Networks, http://www.flukenetworks.com/enterprise-network/wireless-network/AirMagnet-WiFi-Analyzer.
"Automated diagnosis of known and unknown soft-failure in user devices using transformed Signatures and single classifier architecture", 38th Annual IEEE Conference on Local Computer Networks, 2013, http://ieeexplore.ieee.org/stamp/stamp.jsp?tp=&arnumber=6761298, 2013.
Chandra, et al., "WiFiProfiler: Cooperative Diagnosis in Wireless LANs", MobiSys'06, Jun. 19-22, 2006, Uppsala, Sweden, http://research.microsoft.com/en-us/um/redmond/projects/virtualwifi/wifiprofiler.pdf., Jun. 2006.
Chen, et al., "Passive Online Wireless LAN Health Monitoring from a Single Measurement Point", SIGMOBILE Mobile computing and Communications Review, http://citeseerx.ist.psu.edu/viewdoc/download?doi=10.1.1.227.8922&rep=rep1&type=pdf, 2010, 2010.
Cheng, et al., "Automating Cross-Layer Diagnosis of Enterprise Wireless Networks", SIGCOMM'07, Aug. 27-31, 2007, Kyoto, Japan, http://cseweb.ucsd.edu/~voelker/pubs/jigsaw-models-sigcomm07.pdf, 2007.
Jaiswal, et al., "Inferring TCP connection characteristics through passive measurements", IEEE INFOCOM 2004, http://infocom2004.ieee-infocom.org/Papers/33_5.PDF, 2004.
Kanuparthy, et al., "Can User-Level Probing Detect and Diagnose Common Home-WLAN Pathologies?", ACM SIGCOMM Computer Communication Review, vol. 42, No. 1, Jan. 2012, Jan. 2012.
Sundaresan, et al., "WTF? Locating Problems in Home Networks", Technical Report, Georgia Tech University, https://duckduckgo.com/?q=WTF%3F+Locating+Performance+Problems+in+Home+Networks&t=ffnt, 2013, 2013.

* cited by examiner

DETERMINING LINK CONDITIONS OF A CLIENT LAN/WAN FROM MEASUREMENT POINT TO CLIENT DEVICES AND APPLICATION SERVERS OF INTEREST

RELATED APPLICATIONS

This application claims the benefit of the earlier filing date under 35 U.S.C. § 119(e) of U.S. Provisional Application Ser. No. 62/103,562 (filed 2015 Jan. 14).

BACKGROUND

Broadband communications networks serve as the platform for client network connectivity/access to global networks, such as the Internet. More specifically, a network operator or service provider (e.g., an Internet service provider (ISP)) typically provides broadband services (e.g., via a broadband network, such as a terrestrial network via fiber or cable, a wireless terrestrial network via cellular, or a satellite communications network), which may serve to provide Internet access for a respective client network (e.g., a customer or client local area network (LAN) or wide area network (WAN), or a consumer home network). In such end-to-end networks, however, issues may arise that result in degraded network performance and a poor client/customer experience. Further, such issues may arise in either the service provider broadband network or the client LAN/WAN, or in both. In that regard, the service provider typically has visibility and monitoring/debugging capabilities with respect to only the broadband communications network, and not the client/customer side of the network. Irrespective of the location/cause of the issues, however, the customer/client looks to the service provider (and typically places the blame on the service provider network) for resolution of the issues.

Further, broadband service providers have increasingly been observing that client network issues (e.g., poor WiFi connectivity or resource constraints in Ethernet client devices) have been resulting in network bottlenecks and performance degradations in the end-to-end communications, especially given the higher internet speeds being provided by the service providers. Accordingly, in order to ensure positive customer/client experiences, and reduce customer complaints about poor Internet connectivity, it is becoming important for service providers to monitor and diagnose the client network (e.g., the client LAN/WAN and/or home network). With satellite-based broadband networks, the issue of quickly pinpointing a problem within the client network becomes more important, because it saves from unnecessarily focusing costly resources for debugging efforts on the satellite link. In the majority of the scenarios, however, the service provider does not own the client network router (e.g., a home or office WiFi router), and thus has a limited view of any client network performance issues. Instead, service providers are typically constrained to infer the client network health based on the traffic flowing through the service provider modems/routers.

For example, with the proliferation of local area wireless networking technologies (e.g., WiFi), such technologies have become a prevalent method for local area networking of client devices to the Internet, and for home-networking of client devices with the Internet (e.g., tablets, smart phones and Smart TVs). In view of the higher data rates supported by WiFi (e.g., based on the 802.11n and 802.11ac wireless networking standards, which can exceed 150 Mbps), there's an impression that WiFi capacities are much higher than the usual WAN capacities (e.g., including fiber-optic and cable internet), and thus are seldom a factor in network performance and slow Internet access. Based on the shared bandwidth nature of such wireless technologies, however, that the effective link bandwidth per client can be significantly lower than the maximum supported capacity. Also, the problem is exacerbated due to interference from devices on adjacent channels as well as intermittent interferences from non-WiFi devices, such as microwaves and cordless phones (e.g., operating in the unlicensed 2.4 GHz band). Further, WiFi router locations also have an impact in the realized signal-to-noise ratio (SNR) at different locations throughout the coverage area—for example, router locations at the corner of a building or house, or in a basement, result in poor SNR for most client devices throughout the structure, which can result in significant WiFi performance degradation.

Currently, however, there are generally no direct, accurate and reliable approaches for regular monitoring of, and for detecting performance problems within, the client network (e.g., a home network or a client LAN or WAN). Some existing passive monitoring solutions require deploying special hardware, which are technology specific (e.g., WiFi channel monitors) and thus provide only a partial view. This makes them costly and undesirable solutions, especially for LAN networks and home networks. Further, the measurements from such special monitors reflect the link conditions only at the location of the device, which may not accurately reflect the conditions at the client devices. In satellite networks, performance degradations within the client LAN/WAN may be inferred based on measurements from the satellite link (e.g., between a remote client terminal or VSAT at the customer/client site and the respective system gateway serving that remote client terminal). In that manner, in a situation where performance degradations persist within the end-to-end satellite network link, and where the satellite link itself is clear and not exhibiting any share of the degradations, such a situation may imply that the degradations are occurring within the client end of the link (e.g., the client LAN or WAN). Hence, identifying performance bottlenecks and other degradations within the client's network currently relies predominantly on indirect methods that are not necessarily accurate or reliable.

One direct approach for assessing network performance of a client home network or client LAN/WAN consists of active speed tests over the respective network. With regard to regular monitoring, however, as a practical matter, such active speed tests cannot be performed on a regular/periodic basis. Being an active test, they are invasive and require performance tests based on active test traffic across the network. Accordingly, such tests (if performed at all) may be sporadically initiated and performed by the client user, and the data is not passed on to the network operator. Further, such tests may only reasonably be performed from some client devices, and, as to other devices, the tests are difficult (if at all possible) to perform from (e.g., Smart TV's and video game consoles).

Further, certain software solutions and products exist for monitoring and diagnosing performance degradation in core or access networks. Such existing tools for network performance management, however, do not focus on the client network (e.g., the client LAN). Moreover, tools for end-to-end bandwidth estimation and bottleneck link capacity estimation using passive techniques have been evaluated mainly for wired networks. Their approach relies on exploiting packet inter-arrival gaps in estimating the bottleneck link rate. Such techniques are not applicable to current slew of LAN technologies including WiFi and power line communication (PLC) networks.

For enterprise wireless local area networks (WLANs), the current approaches for monitoring and identifying performance problems predominantly focus on the use of specialized monitors within the WLAN. For example, such approaches are discusses in the following documents: (1) R. Chandra, V. N. Padmanabhan and M. Zhang, "WiFiProfiler: Cooperative Diagnosis in Wireless LANs," ACM MobiSys 2006; (2) Y. C. Cheng, M. Afanasyev, P. Verkaik, P. Benko, J. Chiang, A. C. Snoeren, S. Savage, and G. M. Voelker, "Automating cross-layer diagnosis of enterprise wireless networks," SIGCOMM Computer Communications Review, August 2007; and (3) "AirMagnet WiFi Analyzer," http://www.flukenetworks.com/enterprise-network/wireless-network/AirMagnet-WiFi-Analyzer. The approaches discussed in these documents combine data from the network, media access control (MAC) and physical (PHY) layers. For home networks, more light-weight solutions focus on end-user measurements [See, e.g., P. Kanuparthy, C. Dovrolis, K. Papagiannaki, S. Seshan, and P. Steenkiste, "Can user-level probing detect and diagnose common home-WLAN pathologies?," ACM SIGCOMM Computer Communications Review, 2012] or in some cases, measurements at the WiFi access point [See, e.g., S. Sundaresan, Y. Grunenberger, N. Feamster, D. Papagiannaki, D. Levin and R. Teixeira, "WTF? Locating Performance Problems in Home Networks," Technical Report, Georgia Tech University 2013]. These solutions generally require either customized software to be installed within the client local network devices of the customer, or the running of active measurement applications by the user. The installation of such specialized software on the customer equipment, however, would be invasive and result in potential push-back or refusal by the customer, and, while active tests may be easy to perform, reliance on the customer for such testing would likely result in sporadic testing and thus would not provide a reliable measure for regular or continuous monitoring.

A passive monitoring approach is provided by X. Chen, B. Wang, K. Suhy and Wei, "Passive Online Wireless LAN Health Monitoring from a Single Measurement Point," SIGMOBILE Mobile Computing and Communications Review 2010. This approach provides the advantage of using a single measurement point within the access link to the Internet gateway, which lies outside the client network. The approach, however, does not provide for concrete thresholds on the performance metrics to identify problems in the WLAN. Accordingly, there is no clear indication regarding use of the monitored metrics for identifying client LAN bottlenecks. Further, [C. Widanapathirana, J. C. Li, M. V. lvanovich, P. G. Fitzpatrick and Y. A. Sekercioglu, "Automated diagnosis of known and unknown soft-failure in user devices using transformed Signatures and single classifier architecture," IEEE Conference on Local Computer Networks 2013] provides a methodology for automatically diagnosing problems on the user side. The focus, however, is on device software and protocol misconfigurations, mainly using wired networks, and adaptation of the methodology for client link performance issues (e.g., WiFi) would be an extremely involved and difficult process (e.g., given the high variation in the link conditions, defining traffic signatures for good and problem cases would be extremely difficult).

What is needed, therefore, is an approach for determining link or path conditions within a client local area network (LAN) or client wide area network (WAN), from a single measurement point to client device(s) and/or application server(s) of interest.

SOME EXAMPLE EMBODIMENTS

The present invention advantageously addresses the foregoing requirements and needs, as well as others, by providing approaches for determining link or path conditions within a client local area network (LAN) or client wide area network (WAN), from a single measurement point to client device(s) and/or application server(s) of interest. By way of example, for a LAN, the measurement point can be within or close to the customer premise equipment (CPE) provided by the service provider to serve the respective client network. By way of further example, for a WAN, the measurement point can be within a Transmission Control Protocol (TCP) end-point or proxy device within the WAN.

In accordance with example embodiments, the behavior of the TCP state evolution in response to the link conditions can be analyzed, where dynamic link conditions can be estimated based on the analysis of the TCP states and their evolution at appropriate timescales. Further, if IP layer NAT information is available, link capacities to individual client devices can also be estimated. According to such example embodiments, the provided approaches utilize transport layer statistics (e.g., TCP layer statistics), and do not require any link layer or physical layer measurements. Internet Protocol (IP) layer Network Address Translation (NAT) information may be used if available, but are not required. Since the approaches rely on TCP layer statistics, there are no requirements or assumptions as to link layer measurements (which can be technology specific, for example, different for WiFi and PLC). Further, according to such example embodiments, the deployment of specialized hardware or software within the client network is not required, and the provided approaches are applicable irrespective of the client applications. Accordingly, the provided approaches can be applied across different link layer and networking technologies, including the various diverse LAN technologies (such as Ethernet, WiFi, Multimedia over Coax (MoCA), Power Line Communications (PLC), digital subscriber line (DSL), copper, microwave and fiber-optic, as well as any path through the Internet).

In accordance with further example embodiments, the provided approaches are also applicable to WAN networks. Broadband communications service providers typically utilize multiple connections to tier-1 or other peer networks, and may also include cloud-based TCP proxies. The backbone networks connecting these gateways nodes/TCP proxies typically do not terminate the TCP connections between the proxy and the server. In this context, TCP sender statistics are utilized for inferring link conditions to the TCP receiver.

The provided approaches thereby realize significant advantages over direct approaches, such as, client-initiated network speed tests. The provided passive methodology does not require any client/customer-based input or efforts. Further, additional test traffic is not injected into the client network, and the approaches are applicable to all client devices (no client device-based testing capabilities are required)—including such client devices as Smart TV, gaming consoles, tablets, etc. Moreover, by monitoring traffic on all client network connections, the provided approaches can be utilized to identify or prioritize resources according to network link conditions specific to those connections (e.g., prioritizing broadband (such as satellite) link resources to connections with healthy network links.

In accordance with example embodiments, a method for determining link conditions within a client network is provided. The method comprises monitoring and recording a plurality of network protocol statistics for each of one or more network connections over the client network, wherein each connection provides data communications between a client terminal node and a different respective client device, and wherein the client terminal node provides access to a broadband communications network for each of the different respective client device(s). The method further comprises determining a plurality of connection metrics for each of one or more of the network connections, wherein each connection metric for a particular network connection is determined based on one or more of the network protocol statistics associated with the particular network connection. The method further comprises performing at least one diagnosis of one or more network or link conditions with respect to each of one or more of the connections over the client network that is of interest, wherein each diagnosis is performed based on an analysis of a respective set of the connection metrics for the respective network connection. The method further comprises providing results of each diagnosis to a system operator or user. By way of example, each connection over the client network comprises a transmission control protocol (TCP) connection between the client terminal node and the respective client device, and the monitored and recorded network protocol statistics for each of the one or more network connections is selected from a set of TCP statistics, including TIMESTAMP, SRC, DST, SRTT, CWND, RWND, IN_FLIGHT, SND_NXT, SND_UNA, LOST, RETRAN, SACK, and MSS. By way of further example, the plurality of connection metrics for each of the one or more of the network connections is selected from a set of TCP metrics, including one or more different metrics based on TCP window statistics measured over different respective time intervals, a metric based on an average of the TCP window statistics over a respective time interval, a metric based on a TCP congestion window statistic, a metric based on a TCP receive window statistic, a metric based on the TCP receive window statistic consisting of a zero window for a respective duration of time, a metric based on a TCP smoothed round trip time statistic, a metric based on an available connection bandwidth, a metric reflecting an average link utilization, and a metric reflecting a link capacity. According to a further embodiment of the method, each of the at least one diagnosis of the one or more network or link conditions is performed on an aggregate basis with respect to all the connections over the client network.

In accordance with further example embodiments, an apparatus for determining link conditions within a client network comprises a communications link monitor operable to monitor and record a plurality of network protocol statistics for each of one or more network connections over the client network, wherein each connection provides data communications between a client terminal node and a different respective client device, and wherein the client terminal node provides access to a broadband communications network for each of the different respective client device(s). The apparatus further comprises a processor operable to determine a plurality of connection metrics for each of one or more of the network connections, wherein each connection metric for a particular network connection is determined based on one or more of the network protocol statistics associated with the particular network connection. The processor is further operable to perform at least one diagnosis of one or more network or link conditions with respect to each of one or more of the connections over the client network that is of interest, wherein each diagnosis is performed based on an analysis of a respective set of the connection metrics for the respective network connection. The apparatus further comprises an interface device operable to provide results of each diagnosis to a system operator or user. By way of example, each connection over the client network comprises a transmission control protocol (TCP) connection between the client terminal node and the respective client device, and the monitored and recorded network protocol statistics for each of the one or more network connections is selected from a set of TCP statistics, including TIMESTAMP, SRC, DST, SRTT, CWND, RWND, IN_FLIGHT, SND_NXT, SND_UNA, LOST, RETRAN, SACK, and MSS. By way of further example, the plurality of connection metrics for each of the one or more of the network connections is selected from a set of TCP metrics, including one or more different metrics based on TCP window statistics measured over different respective time intervals, a metric based on an average of the TCP window statistics over a respective time interval, a metric based on a TCP congestion window statistic, a metric based on a TCP receive window statistic, a metric based on the TCP receive window statistic consisting of a zero window for a respective duration of time, a metric based on a TCP smoothed round trip time statistic, a metric based on an available connection bandwidth, a metric reflecting an average link utilization, and a metric reflecting a link capacity. According to a further embodiment of the apparatus, each of the at least one diagnosis of the one or more network or link conditions is performed on an aggregate basis with respect to all the connections over the client network.

In accordance with further example embodiments, a system comprises one or more client devices and a customer premise terminal, wherein the one or more client devices are connected to the customer premise terminal via a client data communications network, and wherein each client device is operable to engage in data communications with the customer premise terminal via a respective communications protocol connection over the client data communications network. The customer premise terminal is operable to provide the client device(s) with access to one or more remote servers via a wide area broadband communications network. The customer premise terminal is further operable to monitor and record a plurality of network protocol statistics for each of one or more network connections over the client network, wherein each connection provides data communications between a client terminal node and a different respective client device, and wherein the client terminal node provides access to a broadband communications network for each of the different respective client device(s). The customer premise terminal is further operable to determine a plurality of connection metrics for each of one or more of the network connections, wherein each connection metric for a particular network connection is determined based on one or more of the network protocol statistics associated with the particular network connection. The customer premise terminal is further operable to perform at least one diagnosis of one or more network or link conditions with respect to each of one or more of the connections over the client network that is of interest, wherein each diagnosis is performed based on an analysis of a respective set of the connection metrics for the respective network connection. The customer premise terminal is further operable to provide results of each diagnosis to a system operator or user.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Approaches for determining link or path conditions within a client local area network (LAN) or client wide area network (WAN), from a single measurement point to client device(s) and/or application server(s) of interest, are described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

In accordance with example embodiments, the behavior of the TCP state evolution in response to the link conditions can be analyzed, where dynamic link conditions can be estimated based on the analysis of the TCP states and their evolution at appropriate timescales. Further, if IP layer NAT information is available, link capacities to individual client devices can also be estimated. By way of example, many broadband communication networks (e.g., satellite networks) use a TCP proxy in the Internet service provider's customer premise equipment (CPE) (e.g., at the edge of the customer wide area network (WAN) or local area network (LAN). The proxy splits the end-to-end TCP connections into two parts—the remote part and the local part (e.g., with the local part being the TCP connection from the TCP proxy to the respective client device on the LAN). The link conditions over the LAN impact the TCP state of the local TCP connection. Accordingly, performance degradations due to link or device limitations within the LAN can be detected by passively monitoring the local TCP connection statistics.

Figure 1A:
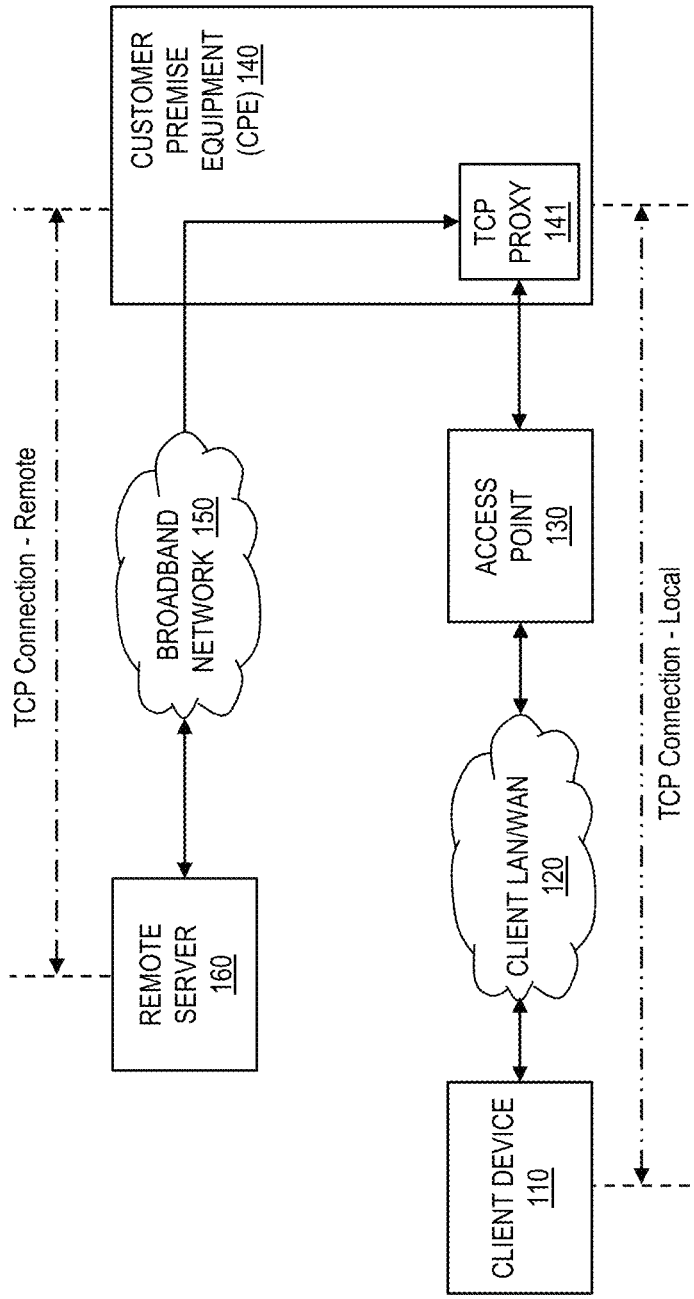
FIG. 1A illustrates a high-level block diagram of an end-to-end network architecture providing for determination of link or path conditions within a client network, in accordance with example embodiments.
Figure 1B:
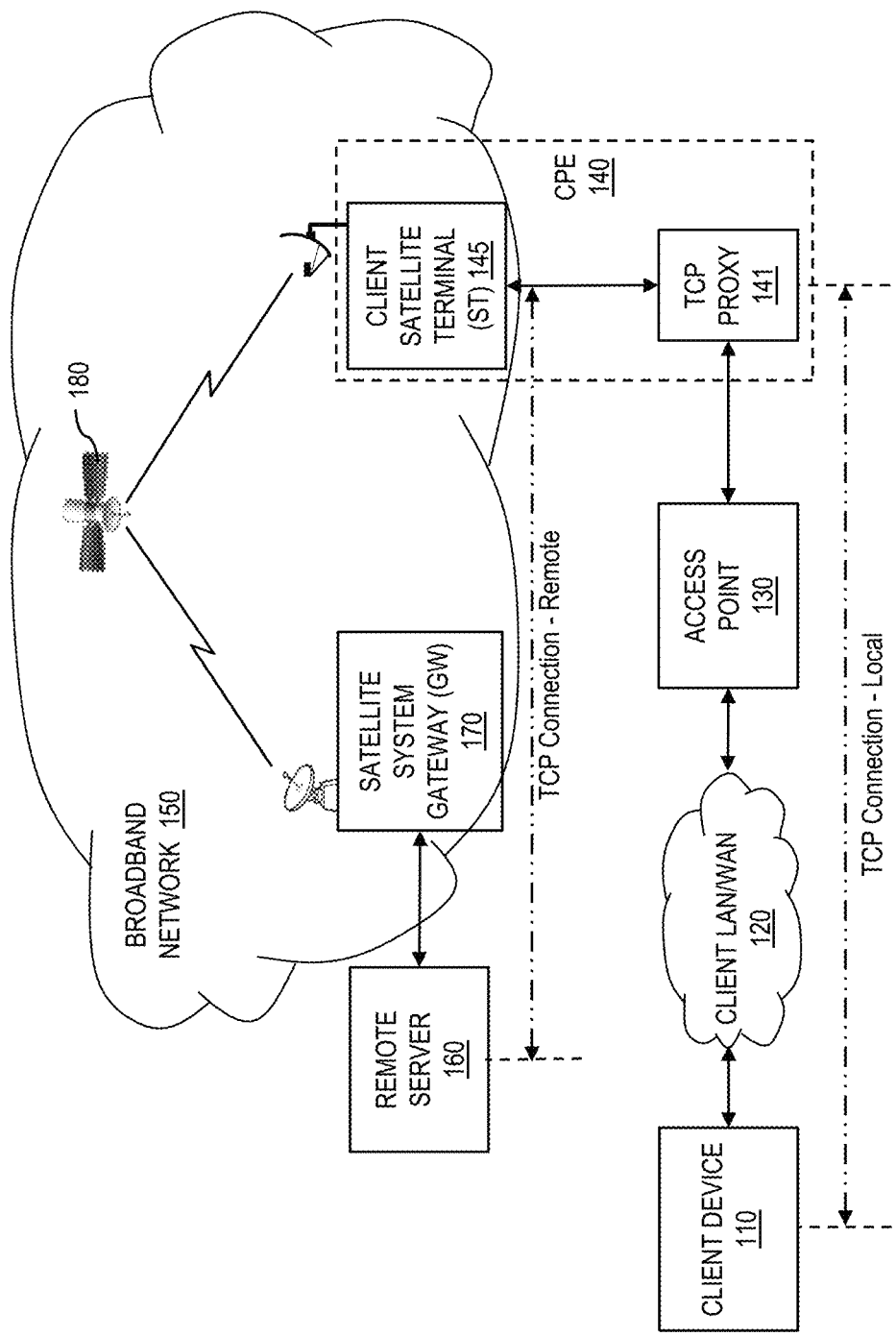
FIG. 1B illustrates a high-level block diagram of an end-to-end network architecture providing for determination of link or path conditions within a client network, where the broadband network is provided by a broadband satellite communications network, in accordance with example embodiments.

FIG. 1A illustrates a high-level block diagram of an end-to-end network architecture providing for determination of link or path conditions within a client network, and FIG. 1B illustrates such an end-to-end network architecture where the broadband network is provided by a broadband satellite communications network, in accordance with example embodiments of the present invention. With reference to FIG. 1A, the network comprises a client device 110, which communicates with an access point 130 via a client local area network (LAN) or wide area network (WAN) 120. The access point may consist of a network modem or router, which may include wireless access capabilities, such as 802.11 WiFi connectivity. The access point connects the client LAN/WAN 120 to the customer premise equipment (CPE) 140, where (as mentioned above) the CPE may include a TCP proxy 141. The customer premise equipment (CPE) generally comprises any terminal and associated equipment located at the premises of the client subscriber, which connects the client network to the communications service provider network. CPE generally refers to devices such as telephones, routers, switches, residential gateways, set-top boxes, fixed mobile convergence products, home networking adapters and Internet access gateways that enable the client subscriber to access the services provided by the respective communications service provider(s) (e.g., the Internet service provider or ISP) and to distribute the services within the subscriber or customer premises (e.g., residential dwelling or local office), for example, via the client LAN/WAN 120. The connection between the client device 110 and the CPE 140 forms the local connection (e.g., a local TCP connection). The CPE 140, in turn, is connected to one or more remote servers (of which only the one remote server 160 is shown in the figure) via the broadband network

150. The broadband network connection or communications services are provided to the subscriber by the communications service provider (e.g., the broadband network comprises the Internet, where the access to the Internet is provided by the client's ISP). With reference to FIG. 1B, the broadband network connection(s) or links are provided via satellite communications services, where such communications services are provided between the client satellite terminal (ST) 154 and the satellite system gateway (GW) 170, over respective forward and return link satellite communications channels via the satellite 180.

Figure 1C:
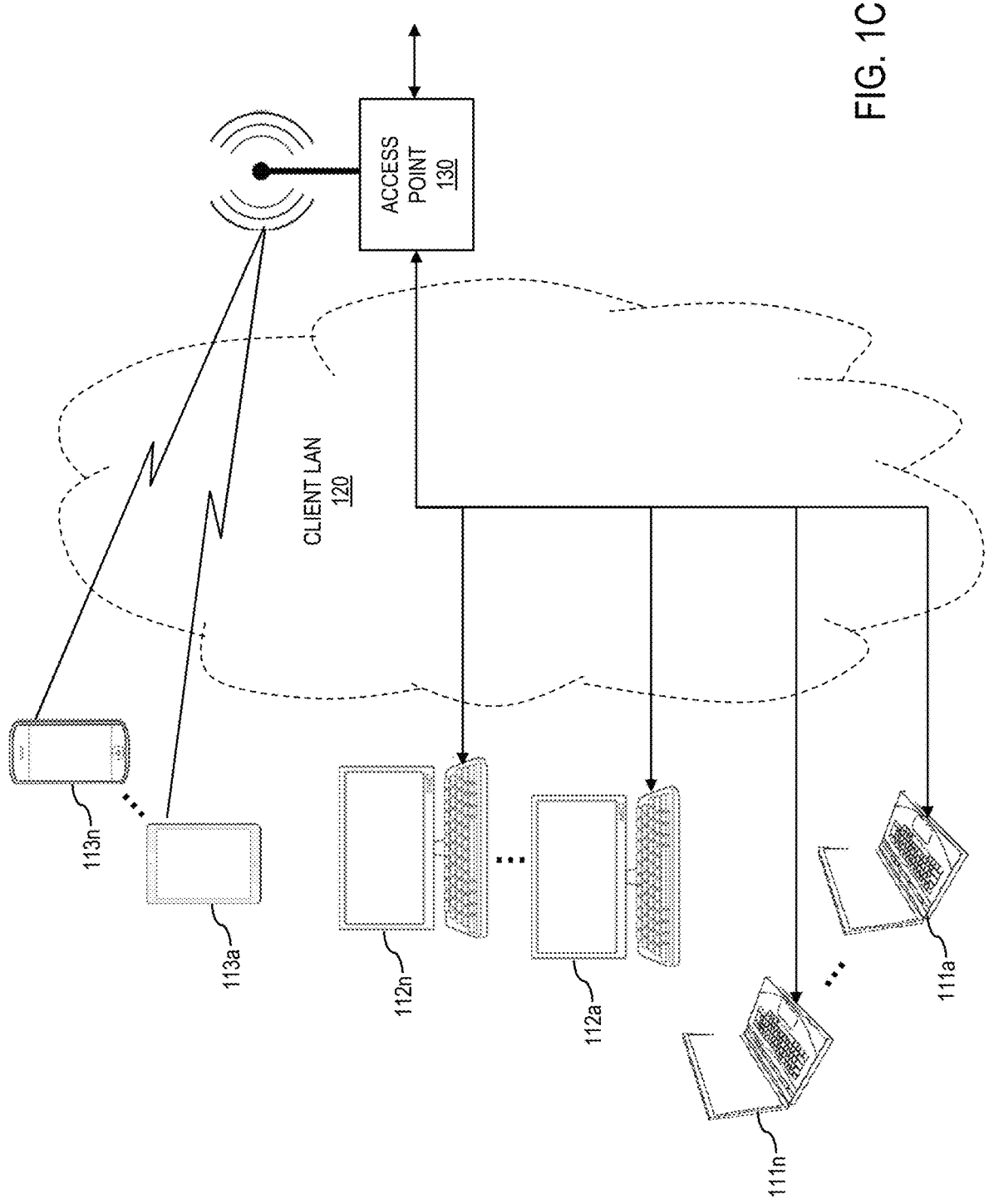
FIG. 1C illustrates a high-level block diagram of a client LAN of FIGS. 1A and 1B, in accordance with example embodiments.
Figure 1D:
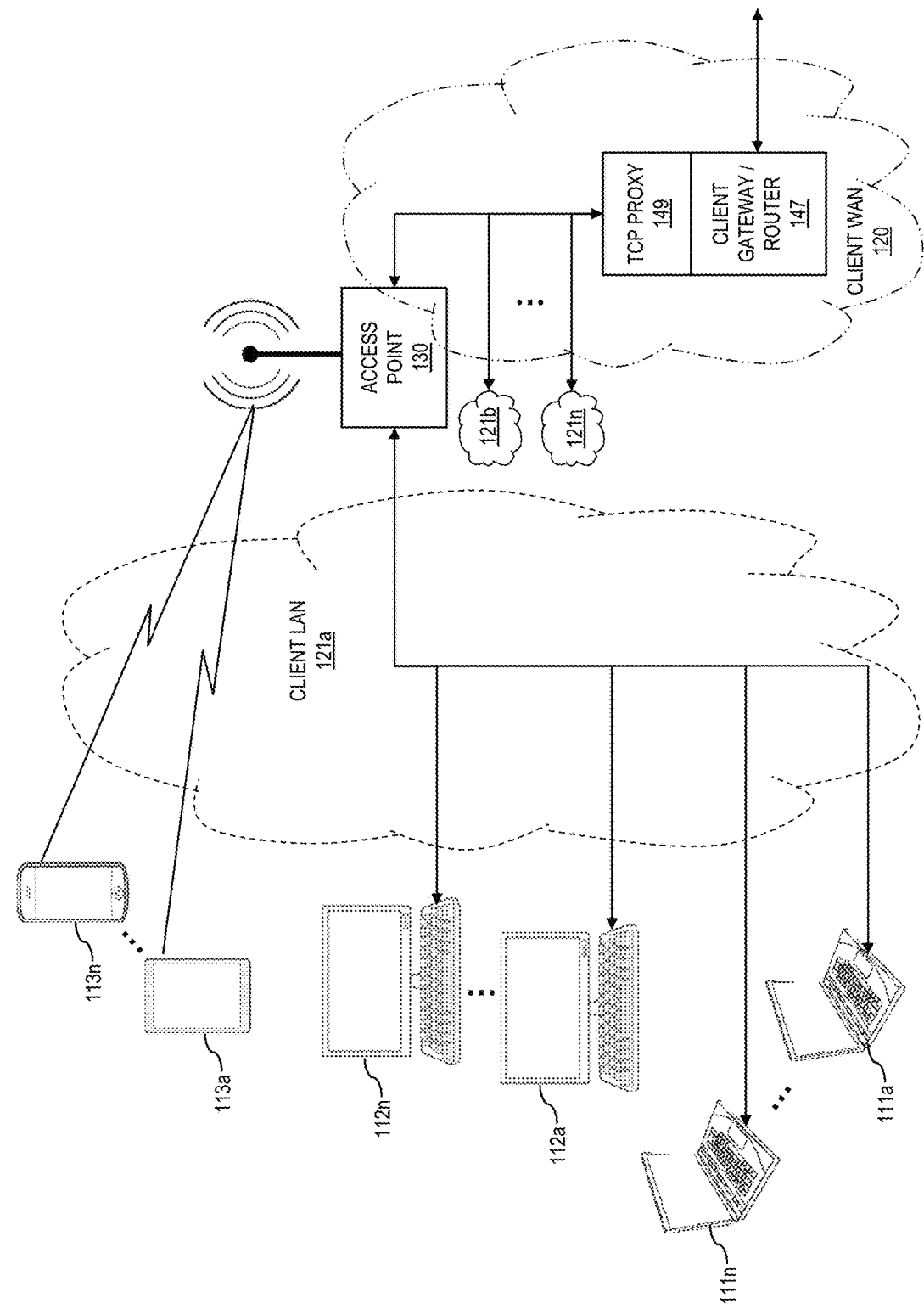
FIG. 1D illustrates a high-level block diagram of a client WAN of FIGS. 1A and 1B, in accordance with example embodiments.

FIG. 1C illustrates a high-level block diagram of a client LAN of FIGS. 1A and 1B, and FIG. 1D illustrates a high-level block diagram of a client WAN of FIGS. 1A and 1B, in accordance with example embodiments of the present invention. With reference to FIG. 1C, the access point 130 may include both wired and wireless connections to the client LAN 120. By way of example, the wired connection may comprise an Ethernet interface and the wireless connection may comprise an 802.11 WiFi interface. The wired interface may provide connections to any number of client devices 110, such as laptops 111*a* to 111*n*, personal computers or servers 112*a* to 112*n*, and wireless devices, including smart phones and tablet computers 113*a* to 113*n*. The LAN may further include network address translation functionality and a firewall. With reference to FIG. 1D, the client WAN 120 provides a large area network interface with multiple, potentially geographically distributed, client sites. By way of example, the WAN 120 may provide access to the broadband network 150 for multiple client LANs 121*a*, 121*b*, . . . , 121*n*, where each such client LAN may provide interfaces for multiple client devices at the respective LAN site (as with the client LAN of FIG. 1C). The client WAN 120 may include a client gateway router or satellite gateway 147 and a TCP proxy 149. The client WAN 120 may be a single dedicated site or may be provided via a cloud-based distributed networking architecture (where the TCP proxy would also be located within the cloud-based distributed networking architecture).

According to such example embodiments, the provided approaches utilize transport layer statistics (e.g., TCP layer statistics), and do not require any link layer or physical layer measurements. Internet Protocol (IP) layer Network Address Translation (NAT) information may be used if available, but are not required. Since the approaches rely on TCP layer statistics, there are no requirements or assumptions as to link layer measurements (which can be technology specific, for example, different for WiFi and PLC). Accordingly, control over the wireless Access Point (AP) is not required or assumed—in particular, no knowledge of MAC and PHY layer statistics for WiFi link conditions, including RSSI, SINR and PHY data rates for various devices, is required. Knowledge about the NAT/ARP table from the Access Point may be helpful, but is not required. By way of example, NAT table information would help in the mapping of different TCP connections to multiple client devices, and thereby help in pinpointing devices with poor network link conditions. Without NAT/ARP table information, however, individual connections with poor network link conditions are still identifiable (excluding a determination of the corresponding specific client device). Further, such network transport layer statistics can be passively (non-invasively) and continuously monitored to dynamically determine client network link conditions, in real-time. Moreover, such approaches impose relatively low processing and memory requirements.

Further, according to such example embodiments, the deployment of specialized hardware or software within the client network is not required, and the provided approaches are applicable irrespective of the client applications. Accordingly, the provided approaches can be applied across different link layer and networking technologies, including the various diverse LAN technologies (such as Ethernet, WiFi, Multimedia over Coax (MoCA), Power Line Communications (PLC), digital subscriber line (DSL), copper, microwave and fiber-optic, as well as any path through the Internet). Further, when focusing on WiFi networks, there is an abundance of devices (e.g., routers and other client devices), different protocol versions (802.11 a/b/g/n/ac) and hardware (2.4/5 GHz band, single or multiple antenna). Moreover, there are differences in the WiFi protocol configuration within the devices (e.g., RTS-CTS, frame-aggregation, Block-ACK, rate adaptation algorithm, etc.) Although information regarding such diverse potential network configurations may not be available at the single measurement point, the provides approaches are applicable across such different potential network configurations, without requiring knowledge about any specific deployed network technologies, client devices and protocol configurations. In accordance with such example embodiments, dynamic network link conditions can be directly inferred. The path may comprise multiple physical links including any of the diverse link-layer technologies. As used hereinbelow, the term "link" refers to the logical link between the measurement point and the client end-point of interest (which may include a path consisting of multiple physical links).

In accordance with further example embodiments, the provided approaches are also applicable to WAN networks. Broadband communications service providers typically utilize multiple connections to tier-1 or other peer networks, and may also include cloud-based TCP proxies. The backbone networks connecting these gateways nodes/TCP proxies typically do not terminate the TCP connections between the proxy and the server. In this context, TCP sender statistics are utilized for inferring link conditions to the TCP receiver. For example, the TCP proxies may be considered as the TCP sender and the application servers may be considered as the TCP receivers. Similarly, TCP receiver statistics can be monitored, and sender statistics can be estimated, at the TCP proxy to estimate the link condition from the application server to the TCP proxy. Here again, the "link" refers to the logical (transport layer) link between the TCP proxy/measurement point and the respective application server (which typically consists of multiple links (Layer 2) or an Internet path consisting of multiple hops).

More specifically, TCP proxy nodes within the WAN can be used to identify link conditions between the proxy and different application servers. Based on measured TCP layer statistics, link conditions from the proxy to a respective server of interest can be accurately estimated. Moreover, based on the TCP statistics at the proxy, the network link conditions in the reverse direction (e.g., the link/path from the server to the measurement point) can also be accurately estimated. In that regard, for the WAN, estimating the link conditions from the measurement point/TCP proxy to various application servers can help in predicting end-to-end network performance. By way of further example, for a broadband service provider (e.g., an ISP), network conditions owned by the ISP can be measured. Accordingly, as well as determining LAN link conditions within the client network, the provided approaches are applicable to the determination of WAN link conditions to the server side, both of which the ISP cannot control or monitor. Accordingly, an end-to-end picture or analysis of link conditions and network performance is thereby provided. Moreover, such link estimates provide critical information for choosing the best gateway/TCP proxy, from a choice of gateway nodes managed by the ISP, to the desired set of application servers; and such link estimates can also be used for load-balancing the different gateways while sustaining a minimum level of network performance.

Further, with regard to WiFi network conditions and the resulting impact on TCP performance, primary causes of degraded WiFi conditions can be generally classified as interference, congestion (e.g., based on many devices sharing a common WiFi access point), and poor signal-to-noise ratio (SNR) performance (e.g., based on distance of the wireless client device from the access point and obstacles between the wireless client device and the access point). Such degradations in WiFi signal/network conditions impact the local TCP connections in various ways—such as (1) interference and packet collisions can result in high round-trip-time (RTT) for TCP data-ack and increased packet losses, and exceeding the congestion window during loss events, (2) congestion can result in the congestion window being consistently full and a relatively higher RTT, and (3) poor SNR can result in the congestion window being consistently full. Further, even with healthy WiFi or Ethernet link conditions, the actual bandwidth can be limited based on the client device. For example, client devices with little available memory may advertise low receive window sizing, which poses a negative impact on bandwidth—hence, the receive window should be taken into account as well.

Accordingly, the approaches of example embodiments focus on certain TCP metrics that reflect or relate to such degraded network conditions. By way of example, such metrics include average RTT and congestion window and receive window sizing. By way of further example, such example embodiments may also apply certain threshold values for the TCP metrics, where such thresholds should account for the changing values of the TCP metrics depending upon the employed client devices and the network configuration. For example, significant variations may be experienced based on the employed protocols and hardware (e.g., 802.11b, 802.11g, 802.11n, 802.11ac, and the number of antennas), and WiFi configuration (e.g., RTS-CTS or QoS-priority wireless multimedia settings). MAC recovery algorithms (e.g., MAC retries) and rate-adaptation algorithms further effect such variations.

In accordance with example embodiments, automated diagnostic algorithms monitor and analyze TCP performance metrics. By way of example, such algorithms monitor and/or measure key TCP performance metrics, and compares the metrics against certain predetermined thresholds for classifying and assessing network link conditions. In one embodiment, the algorithm passively and continuously monitors all the TCP connections and periodically generates a health report. For a given measurement window, the algorithm obtains metrics like TCP window utilization, RTT and estimated available bandwidth for each of the active connections, as well as link bandwidth to specific client device(s) (in case of LAN diagnostic) or specific application server(s) (in case of WAN diagnostic).

According to example embodiments, the algorithm addresses the client LAN scenario. Each connection is labeled as having good or bad (or in some cases marginal) LAN link characteristics, based on thresholds with respect to the monitored metrics. The thresholds are independent of the type of applications utilizing the network links, and independent of the respective client devices, including the wireless access point and the wireless network configuration. The summary report for the measurement window will include the fraction of connections with poor LAN link characteristics. When the wireless access point does not translate the client device address based on a network address translation (NAT) table (or when the NAT tables are made available to the CPE (e.g., the satellite terminal), the algorithm groups the connections per device (by IP address) and attributes the overall LAN link quality to individual devices. In this manner, the particular user device(s) associated with the poor LAN link conditions can be identified. In the absence of NAT information (e.g., when the algorithm sees only one IP address for all the client devices), the algorithm classifies the connections as good and bad, and provides a limited inference about existence of "some" (or at least one) client device with poor wireless connectivity. According to further example embodiments, for the WAN scenario, the algorithm uses the same set of TCP metrics, but applies different weights and different thresholds. Also, instead of classifying the link between the TCP proxy (e.g., at the gateway or in the cloud) and the server into two levels as good or bad, it can classify the links into multiple levels. Thereby, a more granular comparison for the WAN link quality can be achieved.

In accordance with one such embodiment, the algorithm runs in the CPE that provides the broadband communications services (e.g., Internet connectivity) to the client network (e.g., a customer premise LAN or WAN or home network). By way of example, the algorithm may be implemented via the client satellite terminal (ST) 145, which provides the broadband communications connectivity to the remote server(s) 160. In this embodiment, the algorithm comprises three parts—(1) collection of raw TCP statistics; (2) periodic post-processing based on the raw statistics to obtain key performance metrics; and (3) determining network link conditions for the given period covered by the monitored/measured statistics.

1. TCP Statistics.

In this embodiment, for raw TCP statistics, TCP connections from the CPE client terminal (e.g., the ST) to the client devices are monitored (e.g., continuously or at a predetermined period that may be configurable). A log of the TCP statistics is generated for each TCP connection. By way of example, for each ACK received from a client device, the following statistics regarding the internal state of the corresponding TCP connection may be polled and logged:

TIMESTAMP—Time of receiving the ACK (as noted by TCP state machine)
SRC—Source IP and Port
DST—Destination IP and Port
SRTT—Smoothed Round Trip Time Estimate (as computed by TCP state machine for Retransmission Timeout (RTO))
CWND—Congestion Window (updated after processing the ACK) (in Segments)
RWND—Advertised Receive Window (in Bytes)
IN_FLIGHT—Number of segments currently waiting to be ACKed
SND_NXT—Send next Byte count
SND_UNA—Send unacknowledged Byte count
LOST, RETRAN, SACK IN_FLIGHT can also be estimated as:

$$\text{IN\_FLIGHT}=((SND\_NXT-SND\_UNA)/\text{MSS})-\text{SACK}$$

where MSS is Maximum Segment Size for the TCP segments. The additional TCP state variables, LOST, RETRAN, SACK, can be used to make inferences about link losses. The Packet Retransmission Ratio (for TCP packets) and the Packet Lost Ratio (ratio of packets actually lost, not counting the spurious retransmissions due to MAC delays and variation in ACK receipts) can also be estimated, however, much of this information is already captured by other statistics.

2. Connection Metrics Determined Based on TCP Statistics.

Figure 5:
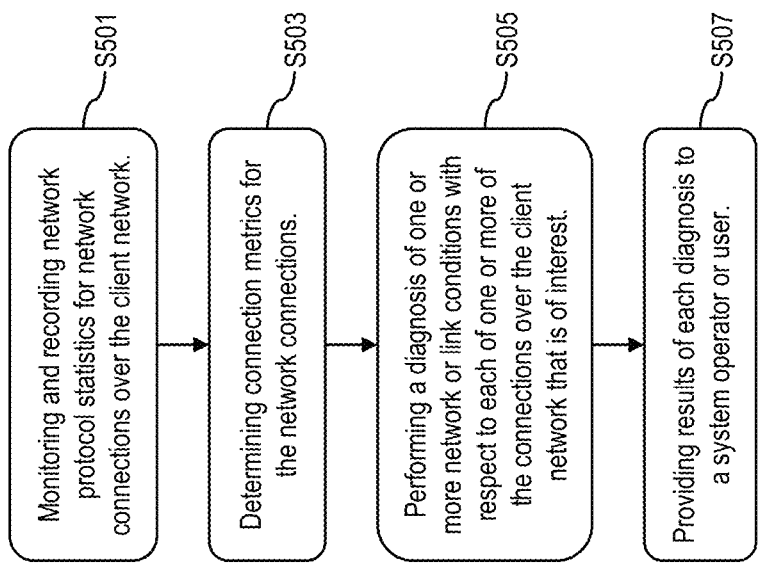
FIG. 5 illustrates a flow chart of a process for performing network diagnostic algorithms, in accordance with example embodiments.

FIG. 5 illustrates a flow chart of a process for performing network diagnostic algorithms, in accordance with example embodiments of the present invention. In accordance with such example embodiments, the internal TCP state for all the connections is monitored and recorded or logged (e.g., continuously or at a predetermined period that may be configurable) (S501 of FIG. 5). By way of example, the TCP statistics for every ACK received is logged, and thus each ACK corresponds to one data sample in the log file. Alternatively, instead of generating logs for every ACK, a statistically filtered time series may be employed. Periodically, for example, with a period of Sample_Interval, the logs can be processed to obtain certain key metrics for the individual connections (S503 of FIG. 5), as further defined below. The metrics provide partial information about the LAN link conditions. These metrics are then combined to give a more comprehensive diagnosis of the link conditions (S505 of FIG. 5). The results from the link conditions diagnoses are then provided to a system operator or user (S507 of FIG. 5)

2.1. Window Utilization:

One metric that reflects link conditions is the CWND. The CWND values, however, depend on the available bandwidth and RTT (available bandwidth≈CW ND/RTT at steady state). Given the large variations in RTT, looking at absolute value of the CWND statistics alone does not help. The notion of "utilizing" the CWND statistic, however, provides important information about the "relative" LAN link quality. Whenever the sender (here, the TCP Proxy at the client ST) has packets to send, it will try to fill up the congestion window. If IN_FLIGHT segments are smaller than the CWND, this implies that the LAN link has sufficient available bandwidth, more than what is required by the TCP Sender. Whenever the IN_FLIGHT segments are close to the CWND, this indicates that either the LAN link is the bottleneck or the available bandwidth is equal to the desired bandwidth. In the event of a timeout or packet loss, the CWND is reduced according to the TCP protocol. In such cases, the IN_FLIGHT segments can exceed CWND. Apart from CWND, the receive window, RWND, should also be accounted for. Even though the LAN link may have high bandwidth, the client device may not be able to effectively use the available bandwidth due to memory restrictions or other flow control bases. Hence, the use of the IN_FLIGHT segments and the send window, WND, which is the minimum of the congestion and the receive window.

Based on the foregoing a new metric is defined as Window Utilization (WU). The WU metric is based on three additional metrics: Instantaneous Window Utilization (IWU), Window Full (WF) and Window Exceeded (WX). By way of example:

$$IWU=IN\_FLIGHT/min(CWND,RWND/MSS) \quad (1)$$

Whenever RWND=0 (Zero Window), IWU is set to 1 (to avoid a divide-by-zero problem).

$$WF=(\# \text{ samples with IWU "close to 1"})/(\text{Total } \# \text{ samples}) \quad (2)$$

$$WX=(\# \text{ samples with IWU greater than 1})/(\text{Total } \# \text{ samples}) \quad (3)$$

Where "close to 1" is defined as Full_IWU_Threshold<IWU≤Exceeded_IWU_Threshold, where Ful-l_IWU_Threshold and Exceeded_IWU_Threshold are configured threshold values (with default=1), and greater than 1 is defined as IWU>Exceeded_IWU_Threshold. The Window Utilization (WU) is then defined as:

$$WU=WF+WX, \text{ when } WX<WX\_Threshold$$

$$WU=1+WX, \text{ when } WX>WX\_Threshold$$

The specific way of combining WF and WX give the following interpretation of the WU metric values:
- WU less than 1 indicates that very few samples saw send window full or exceeded, which implies that the LAN link had sufficiently high bandwidth (compared to the application server, WAN or satellite link bandwidth) as well as the connection had insignificant amount of losses on the LAN link.
- WU close to 1 indicates that most sample saw send window fully utilized, which implies that LAN link bandwidth is less than or just comparable to the satellite bandwidth, or flow-control at the client device limited the connection bandwidth
- WU greater than 1 indicates significant packet losses in the LAN link (e.g., due to high interference or congestion levels)

Where (1) "less than 1" is defined as 0≤WU≤Full_WU_Threshold, where Full_WU_Threshold is a configured threshold value, (2) "close to 1" is defined as Full_WU_Threshold<WU≤Exceeded_WU_Threshold, where Exceeded_WU_Threshold is a configured threshold value (with default=1), and (3) "greater than 1" is defined as WU>Exceeded_WU_Threshold.

Instead of defining a single metric WU, the two different metrics WF and WX (Equations (2) and (3)) can be retained, where WF captures the LAN link conditions as compared to the satellite (and WAN) link speeds, and WX captures the LAN link unreliability, independent of the satellite link conditions. Alternatively, instead of binning IWU samples into WF and WX and combining them into WU, a more generic function can be employed to map IWU samples t to the WU metric. The method described above, however, provides a simple but useful way of summarizing the IWU samples. Lastly, although flow-control by the client device is captured, the zero window events are not sufficiently captured by this metric.

2.2. Delta Window Utilization and Average Window Utilization:

The Window Utilization (WU) metric described above is calculated using the IWU samples over the Sample_Interval. In some cases, for example, when estimating available bandwidth, a similar metric may be useful, measured over smaller timescales, to reflect the "instantaneous" conditions. Accordingly, instead of using the larger Sample_Interval, the Delta Window Utilization (DeltaWU), measured over a smaller Delta_Interval can be used. In this instance the same equations, thresholds and conditions (described above with respect to the determination of the WU metric) are employed. The TIMESTAMP statistics associated with every ACK are used to bin them into appropriate Delta_Intervals.

A further metric is the Average Window Utilization (Avg. WU). There are multiple Delta_Intervals within a Sample_Interval. Combining the DeltaWU, as employed below with respect to the defined algorithm for the Avg. WU, provides the Average Window Utilization (Avg. WU) over the Sample_Interval. Thus, both WU and Avg. WU are defined over a Sample_Interval, but they are calculated slightly differently. While WU is purely a sample average, the Avg.WU is a mixture of time and sample average. The DeltaWU and Avg.WU metrics are employed for calculating the available connection bandwidth and link capacity estimates (further defined below).

---
Algorithm Avg.WU—Average Window Utilization
---
```
N = ceil (Sample_Interval/Delta_Interval)
// Initialize
DeltaWU_vec = rep(0, N)
Sum_n_wx = 0
Sum_n_wf = 0
For n in 1:N
    // For current Delta_Interval
    Obtain TCP connection statistics for every ACK with TIMESTAMP in
    [(n – 1) * Delta_Interval, n * Delta_Interval)
    From these samples
        Measure DeltaWU            //WU defined over Delta_Interval
    DeltaWU_vec[n] = DeltaWU
    If DeltaWU > Exceeded_WU_Threshold    // Window is exceeded
        Sum_n_wx = Sum_n_wx + 1
    Else If DeltaWU > Full_WU_Threshold   // Window is fully utilized
        Sum_n_wf = Sum_n_wf + 1
    // End if
// End for loop
// Average Window Utilization estimate for the Sample_Interval
If Sum_n_wx > N * WX_Fraction_Threshold
    // Window Exceeded for significant fraction of time
    Avg_WU = 1 + (Sum_n_wx/N)
Else
    // Fraction of time window was fully utilized
    Avg_WU = (Sum_n_wf + Sum_n_wx)/N
// End if
```
---

2.3. Congestion Window Utilization:

The window utilization metrics consider the send window, and thus are governed by the minimum of the congestion-controlled and flow-controlled TCP window. Using the IN_FLIGHT and CWND statistics, however, focus only on the congestion in the link. To capture this separately, a Congestion Window Utilization (CWU) metric can be employed. Instead of IWU, Instantaneous Congestion Window Utilization (ICWU) is defined as IN_FLIGHT/CWND. Using a similar function as with the WU, CWF and CWX (analogous to WF and WX) are determined, and then combined to determine the CWU metric. Also, analogous thresholds (Full_ICWU_Threshold, Exceeded_ICWU_Threshold, WX_Threshold) are utilized to define the CWU metric, and Full_CWU_Threshold and Exceeded_CWU_Threshold are utilized to interpret its values. As with WU (as described above), the ICWU to CWU equations can be generalized, while still retaining the range of metric values and their interpretation. Similarly, DeltaCWU (over the Delta_Interval) and Avg. CWU (time-averaged DeltaCWU over Sample_Interval) can be defined and determined as described above with respect to the Window Utilization (WU) metric.

2.4. Receive Window Utilization:

Additional complementary metrics (similar to CWU and WU) can further be employed. CWU focuses on the bottleneck link due to congestion-control, and WU considers both congestion-control and flow-controlled link bottlenecks. To focus only on the scenarios when receive window is the bottleneck (flow-controlled) a Receive Window Utilization (RWU) metric can be employed (similar to CWU and WU). By way of example, starting with an Instantaneous Receive Window Utilization (IRWU) being defined as IN_FLIGHT*MSS/RWND, similar thresholds can be employed for binning instantaneous fraction per ACK to get the summary metric Receive Window Utilization (RWU). Similarly, again, DeltaRWU (over Delta_Interval) and Avg. RWU (time-averaged DeltaRWU over Sample_Interval) can be defined and determined as described above with respect to the Window Utilization (WU) metric.

2.5. Zero Window Fraction:

While metrics like WU and RWU address flow-control by the client device, some extreme zero window cases are not sufficiently addressed. For example, if a client device keeps a zero window for a long duration, the TCP sender will not send any packets and there won't be any ACKs. Sample averages for this scenario may not capture the device bottleneck, especially when the sample average will be skewed when the window opens up. Hence, a time average Zero Window Fraction (ZW) metric can be used for the duration when the connection has a zero window.

By way of example, the beginning of a zero window period is marked by an ACK with RWND=0. The next received ACK (either an explicit window update ACK by the receiver/client device or a response to a TCP sender zero window probe message) indicates the end of the zero window period. The Zero Window Fraction (ZW) metric is defined as the fraction of time when the receive window was zero, as follows:

$$\text{Zero Window Duration (per zero window event)} =$$
$$-1*((TIMESTAMP \text{ for } ACK \text{ with } RWND = 0) -$$
$$(TIMESTAMP \text{ for next } ACK \text{ with } RWND \mathrel{!}= 0)),$$
$$\text{when there is some } ACK \text{ with } RWND \mathrel{!}= 0 \text{ that follows} =$$
$$((TIMESTAMP \text{ for end of current Sample\_Interval}) -$$
$$(TIMESTAMP \text{ for } ACK \text{ with } RWND = 0)),$$
$$\text{when there is no subsequent } ACK \text{ received in the Sample\_Interval}$$

The metric of interest, Zero Window (ZW), is then defined as:

$$ZW = \text{Sum of Zero Window Durations/Sample\_Interval}$$

A high value of ZW indicates a significant duration during which the client device could not accept any additional data, and a threshold of ZW_Threshold is employed as a threshold indication of significant device bottleneck which should be accounted for in LAN health.

2.6. Average Smoothed Round Trip Time:

An Average Smoothed Round Trip Time (Avg.SRTT) metric can be defined as the average of the SRTT samples for the connection logged within the Sample_Interval. The RTT samples for TCP segments over WiFi links vary a lot—in time as well as from device to device. The shared nature of the wireless channel and its varying channel conditions result in time variations. For average or bad channel conditions, RTT variations from device to device can be significant due to the protocol features supported by the wireless Access Point and the client devices, and the respective configurations. Some of such features include, antenna performance, MIMO, packet capture capabilities, supported PHY data rates, rate-adaptation algorithms, RTS-CTS, QoS-priority, Block-ACK, etc. Despite these differences, high average RTT can be generally viewed as an indication of poor link within the LAN. Based on some protocol parameters and empirical observations, the thresholds Moderate_RTT_Threshold and High_RTT_Threshold are configured to indicate high levels of interference and/or collisions.

Further, the Avg. SRTT metric assumes that high SRTT is due to poor link conditions. However, RTT can be increased due to peculiar settings of the home network configuration, where queueing delays can be introduced due to segmentation offloading, traffic shaping or heavy buffering in the wireless access point. Accordingly, a further metric is defined below—available connection bandwidth, which addresses such situations. But even without estimated available bandwidth, the Avg.SRTT metric works in typical home network scenarios. Additionally, the SRTT variable used by TCP state machine discards RTT samples for retransmitted (by TCP) segments. Such discarded RTT samples to calculate the Avg.SRTT metric. Including such RTT samples, however, can skew the averages, hence the metric needs to be interpreted appropriately.

2.7. Available Connection Bandwidth:

A direct measure of link or connection quality is the available bandwidth/data rate. Connection goodput, counted as the bytes transmitted per unit time, reflects only the partial conditions. For example, goodput can be low because the sender (either the application server or the proxy sender at the CPE—the client ST) itself does not have data to transmit all the time. Applications like Youtube and Netflix will have low goodput because of time-spacing while downloading the video segments. To estimate the true LAN conditions, the available bandwidth should be determined, that is, the maximum data rate the connection can achieve within the LAN, provided the link and traffic conditions for other connections do not change.

At steady state, the TCP send window (WND) divided by the RTT gives an estimate of this available connection bandwidth (ConnBW). The send window accounts for both the congestion window and the receive window, and thus WND/SRTT reflects the minimum of congestion-controlled and flow-controlled bandwidth. This estimate, however, can be inaccurate in many cases. Firstly, both WND and SRTT can vary a lot, especially in WiFi links in the LAN. Hence, their mean values should be used at the appropriate timescale, Delta_Interval. Secondly, if the sender does not send a sufficient number of packets, the WND variable may not be updated to reflect true value of the send window that can be reached. Hence, the mean(WND)/mean(RTT) estimate provides a good approximation when the mean is determined over appropriate timescales, and, only in intervals when the send window is sufficiently utilized. Based on a combination of these observations, an algorithm for estimating available connection bandwidth (ConnBW) is defined as follows:

---
Algorithm ConnBW—Available Connection Bandwidth

```
N = ceil(Sample_Interval/Delta_Interval)
HIGH_BW = 1e9  // A very high value for connection bandwidth
// Initialize
ConnBW_vec = rep(0,N)
DeltaWU_vec = rep(0,N)
Sum_n = 0
Sum_ConnBW = 0
For n in 1:N
   // For current Delta_Interval
   Obtain TCP connection statistics for every ACK with TIMESTAMP in
   [(n − 1) * Delta_Interval, n * Delta_Interval)
   From these samples
      Measure DeltaWU
      // Find goodput using SND.NXT or SND.UNA variables
      Goodput = Total Bytes sent * 8/Delta_Interval
      // Estimate current bandwidth as mean(WND)/mean(RTT)
      ConnBW_cur = mean(min(CWND, RWND/MSS) * 8 * MSS)/mean(SRTT)
   // Correct the estimate if lower than observed goodput
   ConnBW_cur = max(ConnBW_cur,Goodput)
   DeltaWU_vec[n] = DeltaWU
   ConnBW_vec[n] = ConnBW_cur
   If DeltaWU > Full_WU_Threshold
      // Window is sufficiently utilized (full or exceeded)
      Sum_ConnBW = Sum_ConnBW + ConnBW_cur
      Sum_n = Sum_n + 1
   // End if
// End for loop
// Average Connection Bandwidth estimate for the Sample_Interval
If Sum_n > 0
   ConnBW = Sum_ConnBW/Sum_n
Else
   ConnBW = HIGH_BW
// End If
```
---

By looking at the appropriate timescale of Delta_Interval, the algorithm obtains meaningful averages. Further, averaging over multiple Delta_Intervals provides a good approximation of the true available bandwidth. The algorithm ignores the mean(WND)/mean(SRTT) estimate for intervals when the window is not fully utilized (DeltaWU<Full_WU_Threshold). Hence, for a Sample_Interval, if Avg. WU is small (only a few DeltaWU≥Full_WU_Threshold), then the ConnBW estimate may not be accurate, and should be used cautiously. Accordingly, the ConnBW metric is more accurate when Avg. WU>Full_AvgWU_Threshold. The accuracy of the connection bandwidth estimate, however, can be improved. By way of example, the samples can be identified and removed when the connection is in the slow-start phase. By way of further example, the congestion-controlled bandwidth and the flow-controlled bandwidth can be separately estimated. Congestion-controlled bandwidth can be obtained by ignoring RWND in the above algorithm and using the CWU instead of the WU metric. Similarly, flow-controlled bandwidth can be determined by ignoring CWND and focusing on the RWND and RWU statistics. Aside from these methods for improving the accuracy of the connection bandwidth estimate, the version as described above provides a sufficiently accurate approximation.

3. Network Link Conditions Determined for Period Covered by the TCP Statistics.

In cases where connections can be mapped to the different respective client devices, metrics for (the 'logical') link to that device can be obtained. For example, when the NAT function is disabled at the access point, or when the NAT table from the access point is made available to the CPE terminal device (e.g., the client ST), certain metrics for the links to the respective client devices can be obtained (as described below). In such example embodiments, the notion of a link to a respective client device refers to the logical link from the client ST the respective client device, which may consist of Ethernet and WiFi links. If the NAT table information is not available, the connections are combined to obtain metrics for the "aggregate LAN link" from the client ST to the respective client device(s).

3.1. Avg. Link Utilization:

Similar to the window utilization metrics (WU and Avg.WU) described above for each connection, a link utilization metric (Avg.LU) can be determined as an indicator of whether the overall link was underutilized, fully utilized or experienced significant losses. The link utilization metric is determined by combining the DeltaWU metrics for each of the connections. For a given Delta_Interval, if the window is exceeded for any of the connections (DeltaWU>Exceeded_WU_Threshold), the link can be considered as being "lossy." If the link is not lossy, but the window is full for any of the connections (DeltaWU>Full_WU_Threshold), the can be considered as being "Full." Then the average link utilization for the sample interval is defined to reflect the time averages for the link to be full or lossy. The details of the algorithm for the Avg. LU are provided, as follows:

---

Algorithm Avg.LU—Average Link Utilization

```
N = ceil (Sample_Interval/Delta_Interval)
// Initialize
DeltaLX_vec = rep(0, N)
DeltaLF_vec = rep(0, N)
Sum_n_lx = 0
Sum_n_lf = 0
For n in 1:N
   // For current Delta_Interval
   For each connection to the client device of interest
      Obtain TCP connection statistics for every ACK with TIMESTAMP
in
    [(n − 1) * Delta_Interval, n * Delta_Interval)
      From these samples
         Measure DeltaWU        //Per connection
      If DeltaWU > E xceeded_WU_Threshold
         // Window is exceeded
         DeltaLX_vec[n] = DeltaLX_vec[n] + 1
      Else If DeltaWU > Full_WU_Threshold
         // Window is sufficiently fully utilized
         DeltaLF_vec[n] = DeltaLF_vec[n] + 1
      // End if
   // End for each connection
   If DeltaLX_vec[n] > 0
      // At least one connection had window exceeded
      Sum_n_lx = Sum_n_lx + 1
   Else If DeltaLF_vec[n] > 0
      // At least one connection had window fully utilized
      Sum_n_lf = Sum_n_lf + 1
   // End If
// End for each Delta_Interval
// Average Link Utilization estimate for the Sample_Interval
If Sum_n_lx > N * LX_Fraction_Threshold
   // Lossy Link for significant fraction of time
   Avg_LU = 1 + (Sum_n_lx/N)
Else
   // Fraction of time link was fully utilized
   Avg_LU = (Sum_n_lf + Sum_n_lx)/N
// End If
```

---

A relatively low value of Avg. LU (e.g., Avg. LU≤Full_AvgLU_Threshold) indicates that (for most of the time) the link did not experience significant losses, and none of the connections experienced bottleneck conditions (congestion or flow-control). A relatively high value of Avg.LU (e.g., Avg.LU>Exceeded_AvgLU_Threshold), indicates that, for a significant fraction of time (LX_Fraction_Threshold), the link had at least one connection experiencing high losses. Otherwise, an Avg. LU that is between Full_AvgLU_Threshold and Exceeded_AvgLU_Threshold indicates that the link was fully utilized.

3.2. Link Capacity:

Link capacity is the data rate supported by the (logical) link under the given channel conditions. One method for estimating the link capacity metric (LinkCapacity) comprises adding the goodput for each active connection. A better estimate of the link capacity can be determined based on available connection bandwidth estimates. More specifically, the link capacity can be determined by summing the connection bandwidth for each active connection, provided the connections are utilizing the available bandwidth (otherwise, the sum will be an overestimate). For example, two connections, if not transmitting simultaneously, will each see the available bandwidth close to the link capacity, where summing them will give an estimate double the actual capacity. To avoid this problem, the window utilization metrics can be used to identify which connections are actively using the link and which are using them only partially. The connection bandwidths can then be appropriately summed to determine a good estimate of the link capacity. Also, if Avg. LU≤Full_AvgLU_Threshold, then the link was not fully utilized, and the LinkCapacity estimate may not be accurate. Otherwise, the algorithm provides a good estimate. A detailed algorithm for determining the LinkCapacity metric is provided, as follows:

---

Algorithm LinkCapacity—Link Capacity Estimate

```
N = ceil(Sample_Interval/Delta_Interval)
HIGH_CAPAC ITY = 1e9      // A very high value for link capacity
// Initialize
DeltaLU_vec = rep(0, N)
LinkCapacity_vec = rep(0, N)
Sum_n = 0
Sum_LinkCapacity = 0
For n in 1:N
   // For current Delta_Interval
   For each connection to the client device of interest
      Obtain TCP connection statistics for every ACK with TIMESTAMP
in
    [(n − 1) * Delta_Interval, n * Delta_Interval)
      From these samples
         Measure DeltaWU      //Per conn
      // Find goodput using SND.NXT or SND.UNA variables
      Goodput = Total Bytes sent * 8/Delta_Interval
      // Estimate current bandwidth as mean(WND)/mean(RTT)
      ConnBW_cur = mean(min(CWND − 2, RWND/MSS) * 8 * MSS)/
       mean(SRTT)
      // Correct the estimate if lower than observed goodput
      ConnBW_cur = max(ConnBW_cur, Goodput)
      If DeltaWU > Full_WU_Threshold
         // Window is sufficiently fully utilized
         // Hence the connection bandwidth estimate can be used
         LinkCapacity_vec[n] = LinkCapacity_vec[n] + ConnBW_cur
         DeltaLU_vec = 1       // Flag to indicate that the link is utilized
      Else
         LinkCapacity_vec[n] = LinkCapacity_vec[n] + Goodput
      // End if
   // End for each connection
   If DeltaLU_vec[n] > 0
      // Link was utilized in this Delta_Interval
      Sum_LinkCapacity = Sum_LinkCapacity + LinkCapacity_vec[n]
      Sum_n = Sum_n + 1
   // End if
```

-continued

Algorithm LinkCapacity—Link Capacity Estimate

```
// End for each Delta_Interval
// Average Link Capacity estimate for the Sample_Interval
If Sum_n > 0
   LinkCapacity = Sum_LinkCapacity/Sum_n
Else
   LinkCapacity = HIGH_CAPACITY
// End If
```

4. Diagnosing LAN Conditions Per Connection.

The TCP performance metrics described above reveal partial information about the underlying LAN link conditions. Based on these performance metrics, the appropriate combination of them provides network information or decision regions for diagnosing the health of the LAN link conditions for a connection of interest. According to further example embodiments, the decision regions can be defined and determined by utilizing a subset of the TCP metrics defined above. Different algorithms are provided for cases when different subsets of metrics are available or desired.

4.1 Window Utilization (WU) and Zero Window (ZW) per Connection:

According to one embodiment, an algorithm is provided for diagnosing the LAN health based on the Zero Window (ZW) and Window Utilization (WU) metrics for LAN link diagnosis. Although this algorithm does not identify all poor LAN conditions, it is useful when metrics like Avg.SRTT or connection bandwidth are not available. Further, instead of WU, the CWU and RWU metrics may be used to separate cases for link or device bottlenecks.

Algorithm 1A—Window Utilization and Zero Window per Connection

```
If ZW > ZW_Threshold
   POOR LAN Condition
   //Client devices receive buffer bottleneck
Else If WU < Full_WU_Threshold
   GOOD LAN Connection
   //LAN is not the bottleneck
Else If WU < Exceeded_WU_Threshold
   MARGINAL LAN Connection
   // Available bandwidth less or equal to Satellite or WAN bandwidth
Else
   POOR LAN Connection
   //LAN experiences significant losses
// End If
```

First, if the connection had zero window for a long fraction of time, the connection can be classified as a "POOR" LAN condition (which includes poor conditions at the client device). Otherwise, WU<Full_WU_Threshold implies that the send window is not fully utilized. In this case, the available bandwidth for the TCP connection on the LAN is higher than the available broadband network bandwidth (e.g., the available satellite bandwidth). When Full_WU_Threshold≤WU<Exceeded_WU_Threshold, the send window is consistently utilized. This implies that either the LAN available bandwidth is approximately equal to the broadband network bandwidth (in which case the LAN has "GOOD" (enough) link conditions), or the LAN available bandwidth is less than the broadband network bandwidth (in which case, the LAN link conditions are "POOR"). But without additional information (like RTT), it cannot accurately be determined whether the LAN is the bottleneck or not, hence it can be classified as "MARGINAL" LAN link conditions. When WU>=Exceeded_WU_Threshold, this indicates that the TCP connection is experiencing significant loss events and retransmissions, leading to congestion window reduction, in-turn, leading to bandwidth reduction—in which case the WiFi connection scenario can be classified as "POOR."

4.2 Avg.SRTT, WU and ZW per Connection:

When RTT statistics are available, the Avg. SRTT metric can be used to supplement the WU and ZW metrics. A relatively high Avg.SRTT indicates high congestion or high MAC retries (due to interference). Combining this metric with the WU and ZW metrics provides a basis for better inference of the link conditions. As before, first, the case when ZW is high (client device causing poor conditions) is treated as a separate case, and the connection can be classified as a "POOR" LAN condition. Then for the remaining cases, the Avg.SRTT and WU metrics can be analyzed using the decision region graph shown in FIG. 2.

Figure 2:
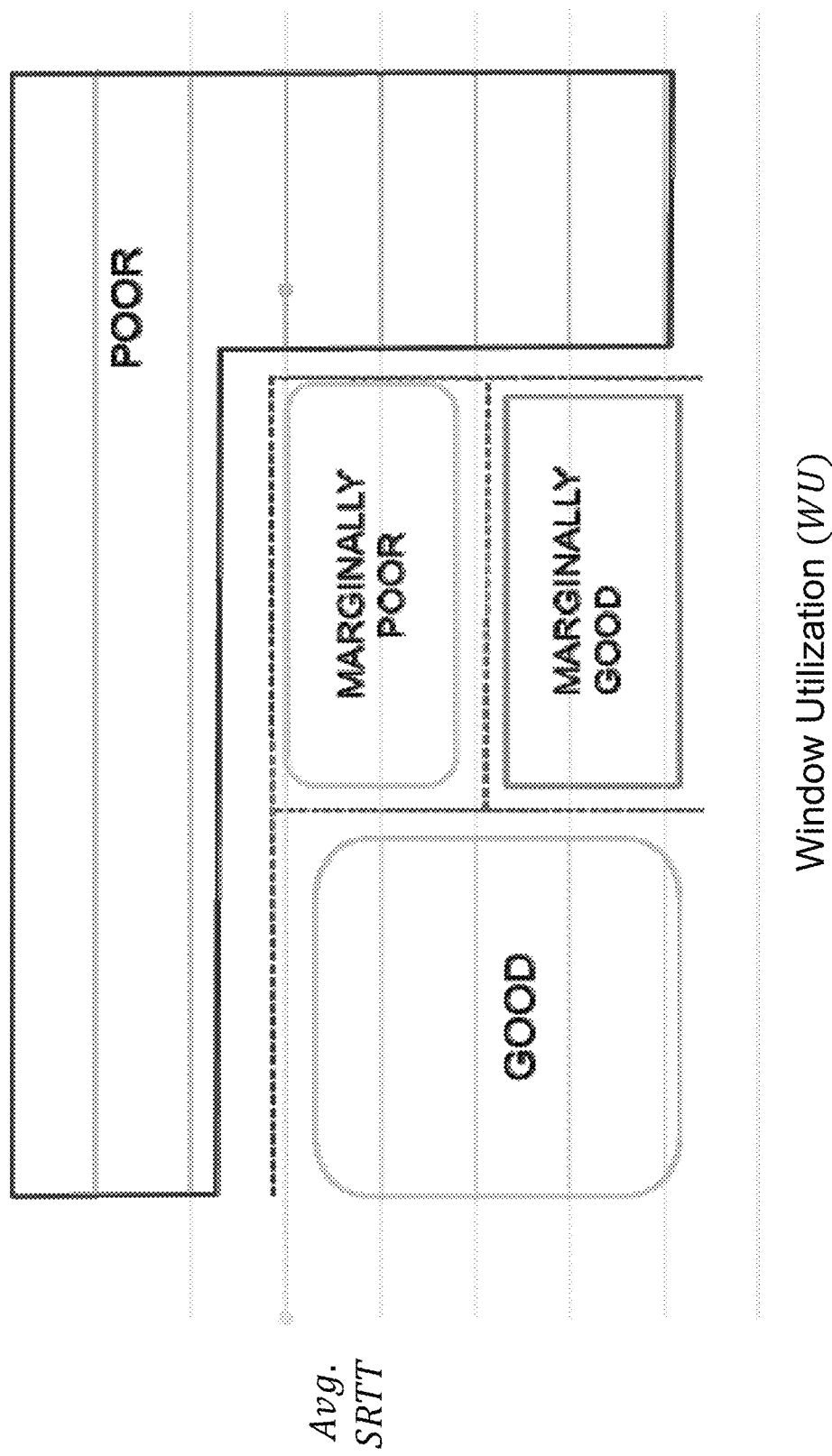
FIG. 2 illustrates a decision region graph for a first network diagnostic algorithm, in accordance with example embodiments.

With reference to FIG. 2, the LAN link conditions for the TCP connection is classified based on the different regions/categories, as follows:

GOOD:
  Low Avg.SRTT ⇒ stable link
  and
  Low WU ⇒ sufficient available bandwidth (BW) (e.g., higher than satellite BW)
POOR:
  Very High Avg.SRTT (e.g., above High_RTT_Threshold) ⇒ high MAC retries or very high congestion
  or
  WU>1 ⇒ unreliable link due to high MAC losses
MARGINALLY POOR:
  WU≈1 and high Avg.SRTT (e.g., above Moderate_RTT_Threshold) ⇒ congested link
MARGINALLY GOOD:
  WU≈1 and Low RTT ⇒ available BW fully utilized, but sufficient BW (when compared to satellite BW)

Algorithm 1B—Avg.SRTT, WU and ZW per Connection

```
If ZW > ZW_Threshold
   POOR LAN Condition
   //Client device receive buffer bottleneck
Else If Avg_SRTT < Moderate_RTT_Threshold
   If WU < Full_WU_Threshold
      GOOD LAN Connection
      //LAN is not experiencing bottleneck
   Else If WU < Exceeded_WU_Threshold
      MARGINALLY GOOD LAN Connection
      //Send window is fully utilized, but sufficient
   Else
      POOR LAN Connection
   // End If
Else If Avg_SRTT < High_RTT_Threshold
   If WU < Full_WU_Threshold
```

```
Algorithm 1B—Avg.SRTT, WU and ZW per Connection

GOOD LAN Connection
    //LAN not experiencing bottleneck even though some congestion & interference
  Else If WU < Exceeded_WU_Threshold
    MARGINALLY POOR LAN Connection
    //Send window is fully utilized and is a bottleneck
  Else
    POOR LAN Connection
    //LAN experiences significant losses
  // End If
Else
  POOR LAN Connection
  //LAN link for the connection is highly congested or has high interference leading to MAC
  retries or TCP segment losses
// End If
```

Apart from making the distinction in the MARGINAL case from Algorithm 1A into good or poor, there are more differences in the link diagnosis from Algorithm 1A. Unlike Algorithm 1A, LAN link diagnosis can be "POOR" even if W<Full_WU_Threshold, when Avg.SRTT is very high (e.g., Avg. SRTT>High_RTT_Threshold). In this scenario, even though the LAN has sufficient available bandwidth (compared to the satellite link), the link is presumably unreliable or highly congested. Typically such high SRTT due to link conditions are accompanied by high jitter which is undesirable for real-time applications.

Where Full_WU_Threshold<WU<Exceeded_WU_Threshold, this implies that the link is fully utilized and potentially congested. A MARGINALLY POOR region can be considered to be the result of congestion (although it can be because of interference—significant interference usually results in much higher SRTT leading it into the POOR region). Hence, the presence of a lot of connections in the MARGINALLY POOR region implies self-congestion in the client home network, and thus the overall LAN condition (aggregated over multiple connections) need not be labelled as MARGINALLY POOR. This distinction, however, is not included in the present embodiment. However, even the POOR region with WU in the range (Full_WU_Threshold, Exceeded_WU_Threshold) and Avg.SRTT>High_RTT_Threshold can be because of high congestion, but is more likely to be because of interference. Hence, when aggregating connections, unlike the MARGINALLY POOR region, lots of POOR connections is not considered as an indication of self-congestion.

Figure 3:
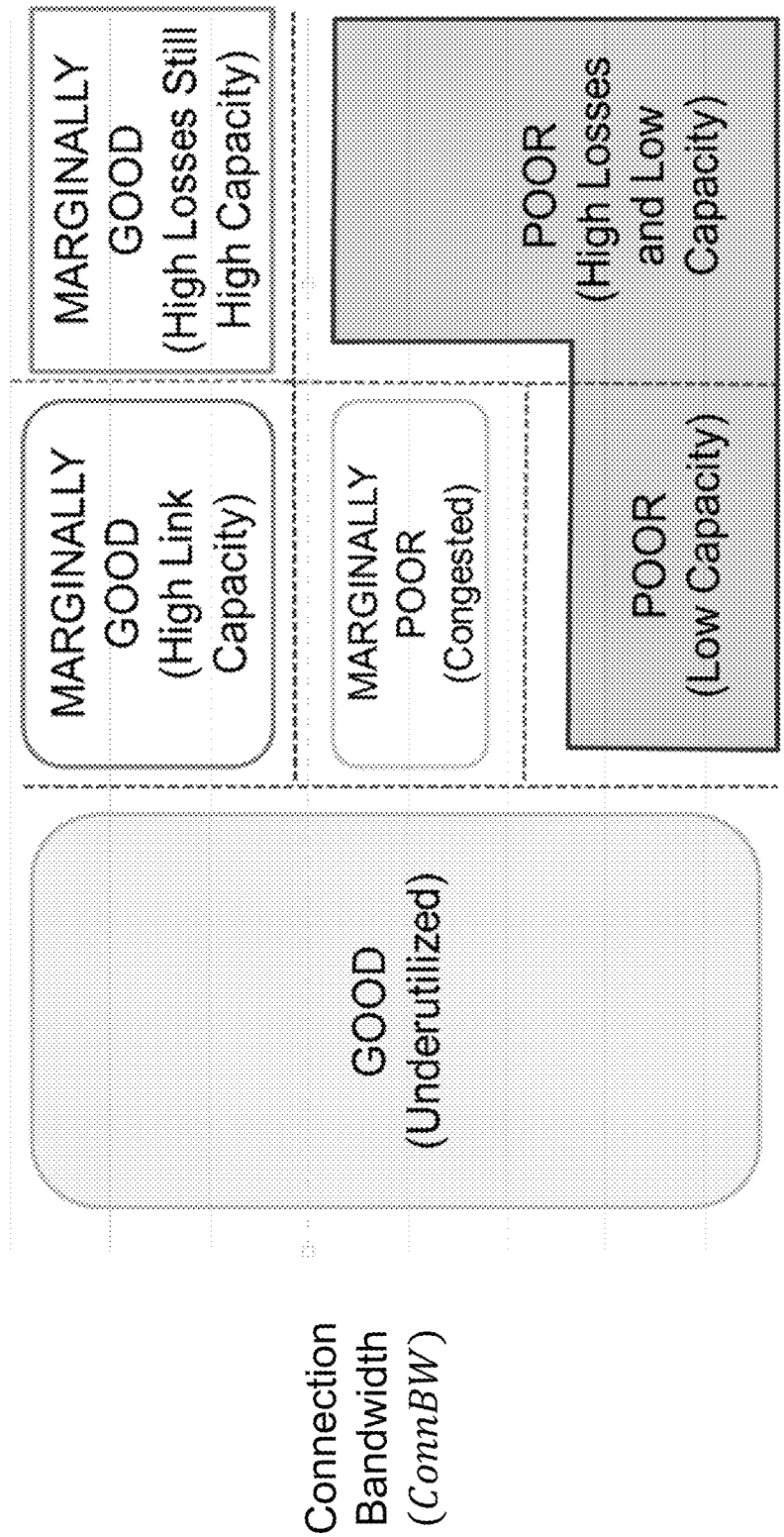
FIG. 3 illustrates a decision region graph for a second network diagnostic algorithm, in accordance with example embodiments.

4.3 Algorithm 1C—Available Bandwidth, Avg.WU and ZW per Connection:

Queuing of packets in the path between the CPE client terminal (e.g., the ST) and the and client device can impact RTT values, which (in some cases) can lead to incorrect inferences from the Avg.SRTT metric. Hence, instead of Avg.SRTT values, the ConnBW (Available Connection Bandwidth) metric can be used. Moreover, the ConnBW metric provides a direct and meaningful interpretation of its value. Also, the Avg. WU metric can be used instead of the WU metric. The decision region graph for this embodiment is depicted in FIG. 3. This algorithm utilizes the thresholds Exceeded_AvgWU_Threshold, Full_AvgWU_Threshold, Moderate_BW_Threshold and Low_BW_Threshold are used.

The meaning of classifications such as MARGINALLY GOOD is different in the present embodiment as compared to the previous algorithm. First, unlike in Algorithm 1B, a POOR connection is not diagnosed when WU is low (e.g., WU<Full_WU_Threshold). Since, for low WU, there is not an accurate estimate of the connection bandwidth, all that can be inferred is that the connection is underutilized. In Algorithm 1B, a high Avg.SRTT indicated a poor LAN connection, even though the link was underutilized. This information is not available if only the WU and ConnBW metrics are used. Second, even for cases that exhibit high losses (e.g., WU≥Exceeded_WU_Threshold), the connection bandwidth can be high, and thus this case can be classified as MARGINALLY GOOD, even though high losses will result in high jitter. Similar to Algorithm 1B, however, lots of MARGINALLY POOR connections can be considered as an indication of self-congestion and not necessarily poor WLAN conditions overall.

```
Algorithm 1C—Available Bandwidth, Avg.WU and ZW per Connection

If ZW > ZW_Threshold
  POOR Client Device
  // Client device receive buffer bottleneck
Else If Avg.WU < Full_AvgWU_Threshold
  GOOD WLAN Connection
  // Send window is underutilized
Else If Avg.WU < Exceeded_AvgWU_Threshold
  If ConnBW > Moderate_BWThreshold
    MARGINALLY GOOD WLAN Connection
    // Send window fully utilized but connection has high bandwidth
  Else If ConnBW > Low_BW_Threshold
    MARGINALLY POOR WLAN Connection
    // Window fully utilized but connection bandwidth moderate low
  Else
    POOR WLAN Connection
    // Send window fully utilized and connection bandwidth is low
  // End If
Else If ConnBW > Moderate_BW_Threshold
  MARGINALLY GOOD WLAN Connection
  // WLAN connection has high bandwidth even though significant losses
Else
  POOR WLAN Connection
  // WLAN connection has high losses as well as moderate to low
  bandwidth
// End If
```

5. Diagnosing Overall LAN Health based on Aggregated Connection Metrics 5.1 Algorithm 2A—Aggregating Multiple Connections for LAN Health Diagnostics:

Algorithms 1A/1B/1C, form the building blocks for diagnosing/classifying LAN conditions for individual connections. According to further example embodiments, the connection level diagnosis is appropriately combined to determine a summary LAN diagnosis. This can be performed even in the presence of multiple devices, by summarizing the fraction of connections classified into different categories.

Algorithm 2A—Aggregating Multiple Connections for LAN Health Diagnostics

```
For Every Connection within the Sample Interval
   Obtain LAN verdict per connection using Algorithms 1B or 1C
   (or Algorithm 1A if RTT statistics not available)
   If ((Nun-t_ACKs > Min_ACKs or ZW > ZW_Threshold) &
   Connection Duration > Min_Duration)
      Increase count for GOOD, POOR, MARGINALLY GOOD,
      MARGINALLY POOR or MARGINAL LAN Connection accordingly
   // End If
//End For Loop
Calculate number of connections with GOOD, POOR, MARGINALLY GOOD,
MARGINALLY POOR or MARGINAL labels
If Total Connections > HI_Conn_Threshold
   //report health only if there are reasonable number of connections
   HI = Fraction of GOOD + MARGINALLY GOOD + MARGINAL connections
Else
   //otherwise, report good health
   HI = 1
// End If
```

Connections with a small number of ACKs may not yield enough samples to arrive at meaningful connection metrics. Also, connections with small duration (time between first and last ACK sample within the Sample_Interval), may yield biased results, and may not reflect the average link conditions. Hence, such connections are filtered out. For the remaining significant connections, the algorithm keeps a count and fraction of the number of connections that fall into different categories. Even a small fraction of connections classified as POOR indicates the presence of at least one client device with poor LAN link conditions. Further, MARGINALLY POOR connections indicate the presence of congestion in the LAN. The congestion, however, may be a result of a lot of connections within the client network, and not necessarily congestion from neighboring home area networks. Hence, if a large number of connections are labelled MARGINALLY POOR (but negligible fractions of connections in the POOR category), it may be diagnosed as a case of self-congestion.

Figure 4:
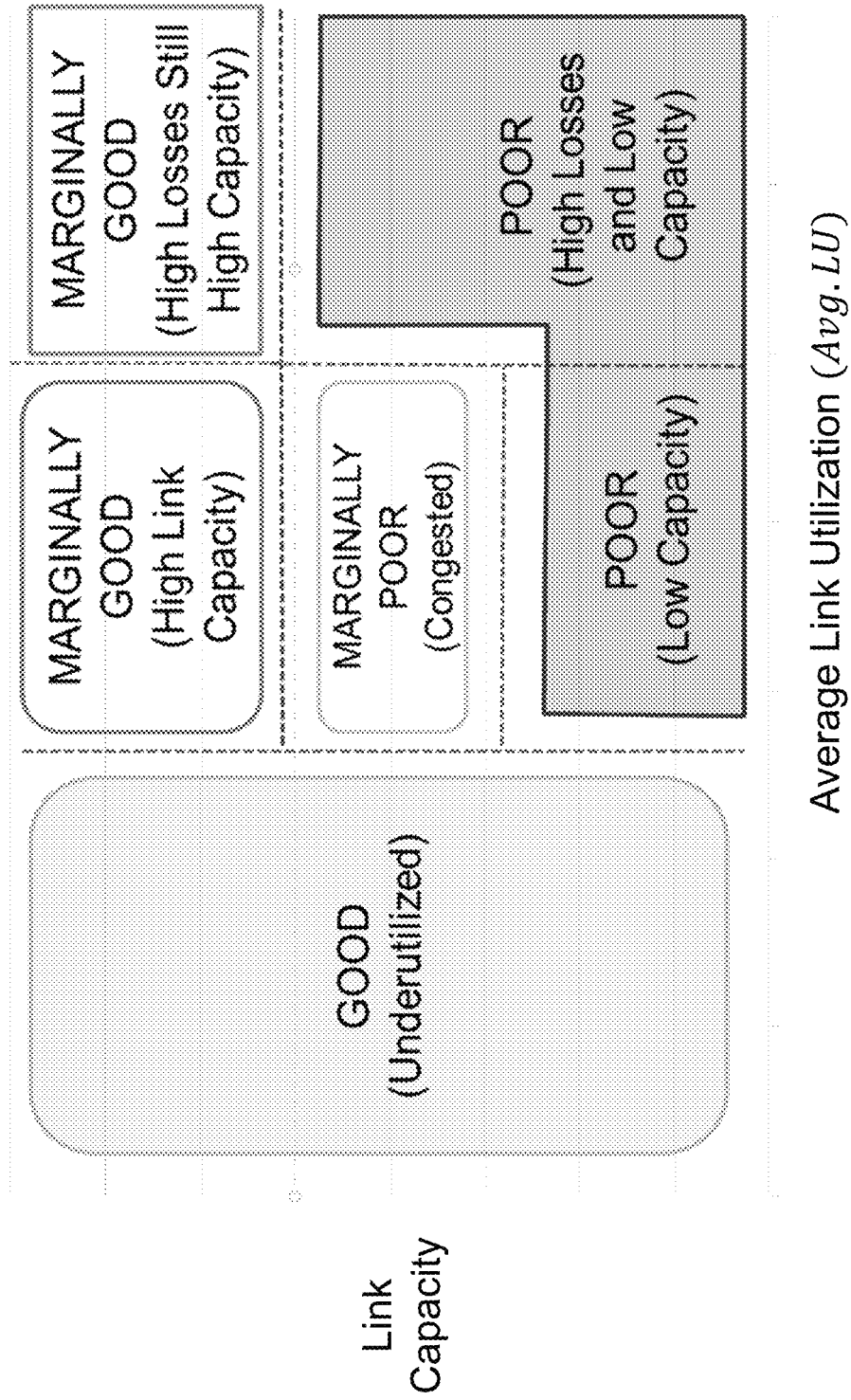
FIG. 4 illustrates a decision region graph for a third network diagnostic algorithm, in accordance with example embodiments.

5.2 Algorithm 2B—Average Link Utilization and Link Capacity:

When mapping connections to specific client devices is possible, the link capacity from the CPE client terminal (e.g., the ST) to the client device can be estimated. This is possible, for example, when the NAT/ARP table at the access point is available to the ST. Similar to the available bandwidth estimate (ConnBW metric) and window utilization (WU metric) (Algorithm 1C), the link capacity estimate (LinkCapacity metric), combined with Average Link Utilization (Avg.LU) metric, can be used to diagnose the LAN health. The decision region graph for this embodiment is shown in FIG. 4, which is similar to the decision region graph of Algorithm 1C. Instead of classifying the link conditions per connection, however, in this embodiment, the overall quality of the LAN link to a particular client device is being classified. If the client devices cannot be individually identified because of the NAT, the algorithm will aggregate all the connections and report a single Link Capacity metric for the overall LAN link (total capacity of the path to all the client devices in the LAN). The interpretation of the different decision regions—GOOD, POOR, MARGINALLY GOOD and MARGINALLY POOR, is similar as in Algorithm 1C.

Algorithm 2B—Average Link Utilization and Link Capacity

```
For Every Client Device // Identified using destination IP
   Calculate Connection Metrics for every connection to the device
   Calculate Link Metrics - Avg LU and LinkCapacity
```

-continued

Algorithm 2B—Average Link Utilization and Link Capacity

```
   If ZW > ZW_Threshold for any one connection
      POOR Client Device
      // Client device zero window bottleneck
   Else If Avg.LU < Full_AvgLU_Threshold
      GOOD WLAN Link
      // Link is underutilized
   Else If Avg.LU < Exceeded_AvgLU_Threshold
      If LinkCapacity > Moderate_BW_Threshold
         MARGINALLY GOOD WLAN Link
         // Link is fully utilized but link capacity is high
      Else If LinkCapacity > Low_BW_Threshold
         MARGINALLY POOR WLAN Link
         // Link is fully utilized, but capacity is moderately low
      Else
         POOR WLAN Link
         // Link is fully utilized and link capacity is low
      // End If
   Else If LinkCapacity > Moderate_BW_Threshold
      MARGINALLY GOOD WLAN Link
      // Link has high capacity even though significant losses
   Else
      POOR WLAN Link
      // Link has high losses as well as moderate to low bandwidth
   // End If
// End for every client device
```

6. Other Variations

Additional methods may be employed to further improve the performance and robustness of the presently provided approaches for determining link or path conditions within a client local area network (LAN) or client wide area network (WAN), from a single measurement point to client device(s) and/or application server(s) of interest algorithm. By way of example, the Avg. RTT and ConnBW metrics can be used, together with the ZW and WU metrics, to distinguish link conditions more accurately as well as increase robustness. For example, using these metrics together, link conditions can be identified with high RTT, even with high bandwidth. Further, additional statistics, such as Packet Loss Ratio, can be collected and used, however, the window utilization metrics (in particular, window exceeded metrics such as WX and CWX) capture the high packet loss events and accurately identify respective lossy links. For example, the window utilization can be separated into WF and WX (see, e.g., the above definition of WU, for more details) to distinguish congestion and interference. Additionally, instead of using just the average values, such as Avg.SRTT, other statistics can be employed, such as like variance, percentiles, etc.

By way of further example, connections in the CPE client terminal (e.g., the ST) can be classified into different application types and application-specific thresholds (or algorithms) can then be employed. The raw statistics collected at every ACK provides useful information to classify connections at a coarse level. By metering the TCP packet flow in both directions, the connections could be classified, for example, into bulk, streaming or interactive. The ST may then estimate the application type using only the TCP statistics and monitoring the traffic flow.

By way of further example, instead of preset thresholds, appropriate thresholds may be determined using machine learning tools based on test cases, and the decision regions could then be dynamically updated while running in the field. All of the above metrics (and any additional lower-layer metrics), for example, can be combined and supervised learning techniques can be applied to classify the links into good or bad links. Further, using respective training dates, existing machine learning tools can build statistical models for classification, based on a chosen set of metrics. Some of the statistical methods can also assign confidence-levels to classification decision. Hence, instead of deterministic decisions on link quality, the algorithms can provide a probabilistic classification for more informed diagnoses.

By way of further example, in the case of a satellite broadband network, satellite link information can be used explicitly as an additional input while analyzing connection performance.

6.1 Uplink Conditions in the LAN:

The above metrics and algorithms focus on characterizing the LAN downlink from the CPE client terminal (e.g., the ST) to the client device. Although a TCP connection is bidirectional, some of the above-described metrics assume that the ST is the TCP sender and the client devices send the ACKs. Metrics such as congestion window utilization can be calculated easily at the TCP sender, but need to be appropriately redefined for the TCP receiver. Hence, for downlink connections or bidirectional connections, if there are sufficient data exchanges in the direction from the ST to the client device, then the estimates for the metrics of interest will be accurate. For scenarios when there is negligible traffic in the downlink direction, however, additional heuristics may be necessary.

For uplink connections from client devices to the ST, the TCP statistics are still relied upon, but the metrics are estimated differently. By way of example, instead of reading the SRTT state variable in the TCP sender part, the average RTT can be estimated at the TCP receiver. One illustrative example to estimate RTT is to find the delay in receiving a new packet after sliding the TCP window. The TCP receiver (the ST) already knows the advertised receive window, and can additionally estimate the TCP sender congestion window by monitoring the flight of TCP segments and noting the timing of sliding TCP sequence numbers. There are known techniques in the literature to estimate the TCP congestion window at any measurement point not at the TCP sender. Thus, the TCP receiver will know when the TCP sender (client device) is bottlenecked because of a filled TCP window (flow-controlled or congestion-controlled). Then, the time from sending the ACK (which will result in TCP sender sliding the window) and receiving the next TCP segment estimates the RTT. Some heuristics may be required to handle corner cases (for example, when the sender has no new TCP segments to send), but there are known techniques for determining good RTT estimates.

Similarly, instead of relying on the congestion window and window utilization to estimate available bandwidth, the TCP receiver can use other techniques to estimate the available bandwidth. For example, the TCP receiver can monitor the rate of arrival of segments within one TCP window. The TCP window size is controlled by the TCP receiver. Then, assuming that the sender is limited only by the TCP window, the receiver can find the time required to receive a window's worth of segments. Thus, the window size and the time required can give an estimate of the uplink available bandwidth for each connection. Again, heuristics may be applied to identify and remove cases when the sender does not have segments to fill up the window.

In all such cases, the utilized TCP layer metrics are derived from monitoring the TCP state evolution, including the TCP sequence numbers, advertised window, etc., and thus the link conditions can be characterized more accurately.

6.2 Link Conditions in the WAN:

For the WAN scenario, the TCP proxy will reside in the gateway within the ISP core network or in the cloud. The TCP statistics available at the proxy can be used in similar fashion to estimate important link condition metrics like RTT, available bandwidth, etc. For connections from the application server to the proxy, metrics similar to those used for LAN uplink diagnostics (as described above in Section 6.1) can be employed. For connections from the proxy to the server, the metrics as described above in Sections 2 and 3 can be employed.

Further, where classification of the link into binary ("GOOD" or "POOR") is not sufficient for WAN scenarios, a more granular classification can be employed. By way of example, the decision regions in the metric space, for metrics like Avg.SRTT, WU and Available Bandwidth estimate can be divided into multiple classes. Such multiple classes can further be used to assign some relative link quality number. For example, high RTT and high WU, may relate to a low link quality number, etc. Machine-learning tools and training data can also be employed in the WAN scenario to determine classification models (decision thresholds). The training data can also provide important insights into the typical values associated with respective network settings.

Figure 6:
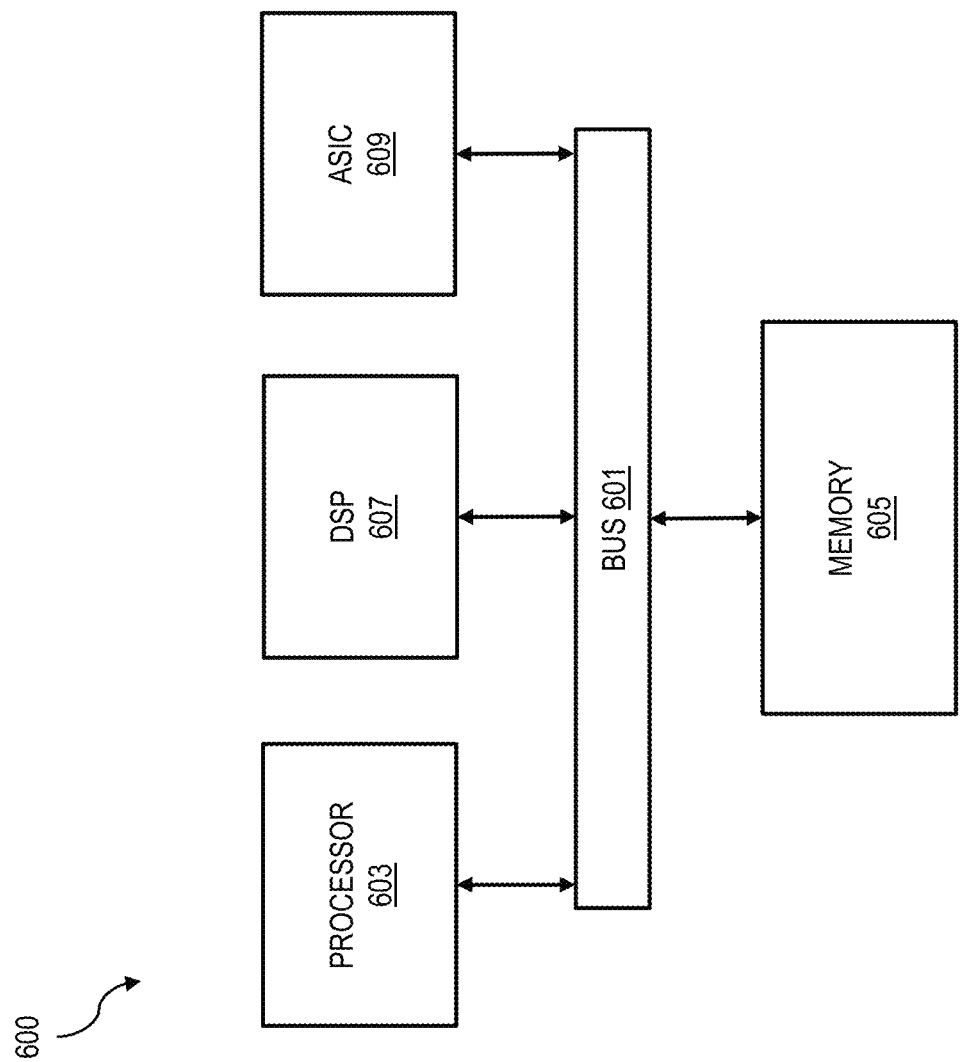
FIG. 6 illustrates a block diagram of a chip set 600 implementing aspects of approaches for determining link or path conditions within a client local area network (LAN) or client wide area network (WAN), in accordance with example embodiments.

FIG. 6 illustrates a block diagram of a chip set 600 implementing aspects of approaches for determining link or path conditions within a client local area network (LAN) or client wide area network (WAN), in accordance with example embodiments of the present invention. Chip set 600 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 600 includes a communication mechanism such as a bus 601 for passing information among the components of the chip set. A processor 603 has connectivity to the bus 601 to execute instructions/programs and process information stored in, for example, a memory 605. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 607, and/or one or more application-specific integrated circuits (ASIC) 609. A DSP typically is configured to process real-time signals (e.g., sound or video) in real time independently of the processor. Similarly, the ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 603 and accompanying components have connectivity to the memory 605 via the bus 601. The memory may include both dynamic memory (e.g., RAM) and static memory (e.g., ROM) for storing executable instructions that, when executed by the processor and/or the DSP 607 and/or the ASIC 609, perform the process of example embodiments as described herein. The memory may also store the data associated with or generated by the execution of the process.

Further, the functionality of the example embodiments of the present invention may be provided by the chip set 600, in response to the processor 603 executing an arrangement of program instructions contained in memory 605. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 7:
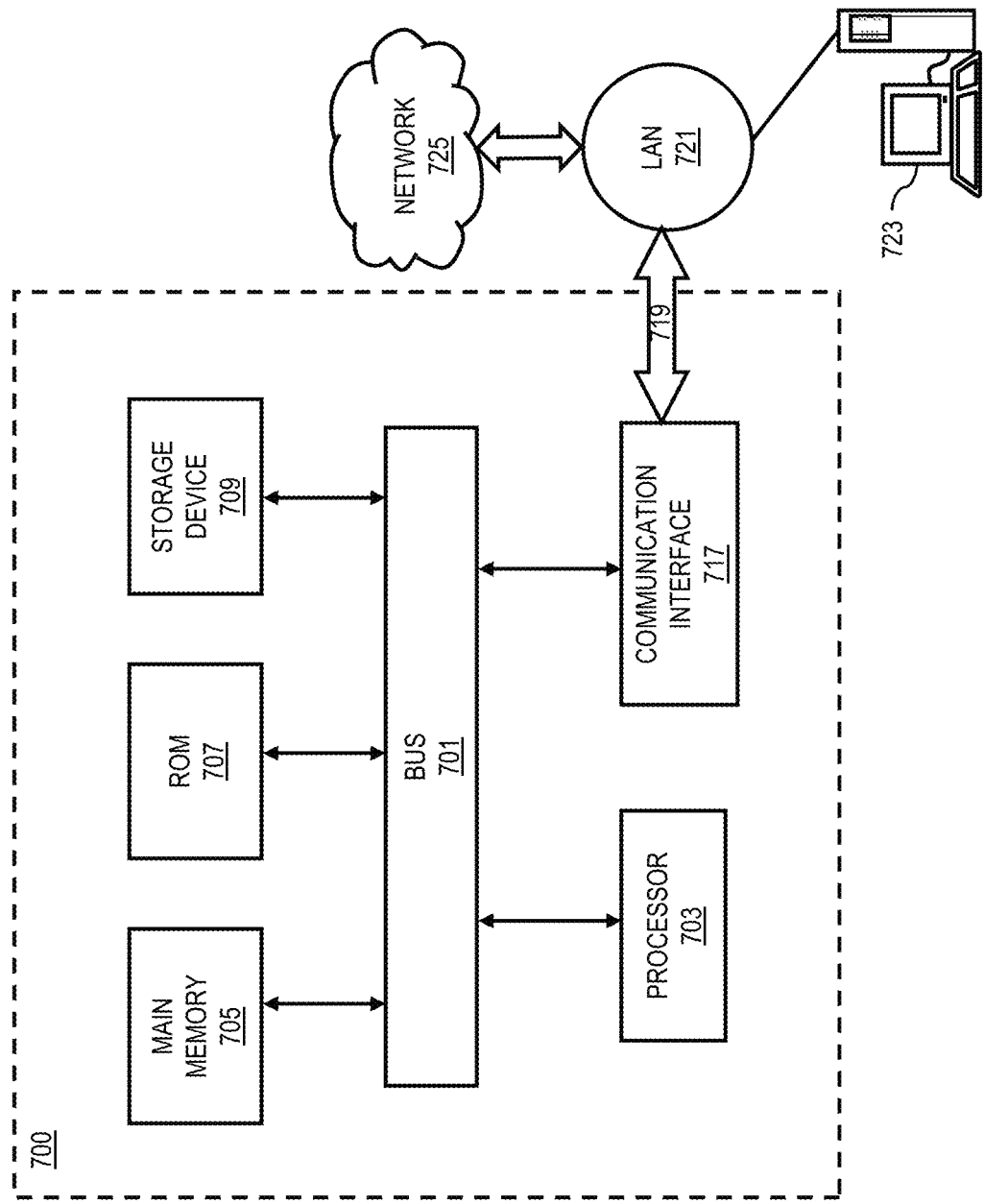
FIG. 7 illustrates a block diagram of a computer system implementing aspects of approaches for determining link or path conditions within a client local area network (LAN) or client wide area network (WAN), in accordance with example embodiments.

FIG. 7 illustrates a block diagram of a computer system implementing aspects of approaches for determining link or path conditions within a client local area network (LAN) or client wide area network (WAN), in accordance with example embodiments of the present invention. The computer system 700 includes a bus 701 or other communication mechanism for communicating information, and a processor 703 coupled to the bus for processing information. The computer system also includes main memory 705, such as a random access memory (RAM) or other dynamic storage device, coupled to the bus for storing information and instructions to be executed by the processor. Main memory can also be used for storing temporary variables or other intermediate information during execution of instructions to be executed by the processor. The computer system further includes a read only memory (ROM) 707 or other static storage device coupled to the bus for storing static information and instructions for the processor. A storage device 709, such as a magnetic disk or optical disk, is additionally coupled to the bus for storing information and instructions.

According to one embodiment of the invention, dynamic and flexible approaches for determining link or path conditions within a client local area network (LAN) or client wide area network (WAN), according to example embodiments, are provided by the computer system 700 in response to the processor 703 executing an arrangement of instructions contained in main memory 705. Such instructions can be read into main memory from another computer-readable medium, such as the storage device 709. Execution of the arrangement of instructions contained in main memory causes the processor to perform the process steps described herein. One or more processors in a multi-processing arrangement may also be employed to execute the instructions contained in main memory. In alternative embodiments, hard-wired circuitry is used in place of or in combination with software instructions to implement the embodiment of the present invention. Thus, embodiments of the present invention are not limited to any specific combination of hardware circuitry and software.

The computer system 700 also includes a communication interface 717 coupled to bus 701. By way of example, the communication interface provides a two-way data communication coupling to a network link 719 connected to a local network 721. The communication interface, for example, may be a digital subscriber line (DSL) card or modem, an integrated services digital network (ISDN) card, a cable modem, or other modem to provide a data communication connection to a corresponding type of telephone line. As another example, communication interface may be a local area network (LAN) card (e.g. for Ethernet™ or an Asynchronous Transfer Mode (ATM) network) to provide a data communication connection to a compatible LAN, or an optical modem configured to provide communications with a fiber-optic network link. Wireless links can also be implemented. Further, the communication interface, for example, includes peripheral interface devices, such as a Universal Serial Bus (USB) interface, a PCMCIA (Personal Computer Memory Card International Association) interface, etc.

The network link 719 typically provides data communication through one or more networks to other data devices. For example, the network link provides a connection through local network 721 to a host computer 723, which has connectivity to a network 725, such as a private wide area network (WAN) or a public WAN (e.g., the Internet), or to data equipment operated by service provider. The computer system 700 sends messages and receives data, including program code, through the network(s), via the network link 719 and the communication interface 717. In the Internet example, a server (not shown) might transmit requested code or content belonging to an application program or service for implementing an embodiment of the present invention via the network 725. The processor 703 executes the transmitted code while being received and/or store the code in storage device, or other non-volatile storage for later execution.

Additionally, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   logging a plurality of statistics obtained through passive monitoring of standard operational statistics of a networking protocol, via a protocol proxy device of a client terminal node of a client network, for each of one or more network connections of the client network, wherein each network connection provides for packet data communications between the client terminal node and a respective client device over a respective link over the client network, and wherein the client terminal node provides access to a wide area data communications network for each client device via the respective network connection over the respective link over the client network;
   determining one or more connection metrics for at least one of the one or more network connections, wherein each connection metric for a particular network connection is determined based on one or more of the logged statistics associated with the particular network connection;
   determining one or more performance conditions with respect to the at least one of the one or more network connections, wherein each performance condition with respect to a particular network connection is determined based on an analysis of a respective one or more of the connection metrics determined for the respective network connection; and
   diagnosing a degradation in performance over one of the links over the client network based on the one or more performance conditions determined with respect to at least one of the network connections over the one link.

2. The method according to claim 1, wherein the monitoring of the standard operational statistics of the networking protocol, the determination of the one or more connection metrics for the one or more network connections and the determination of the one or more performance conditions are performed passively without sending any additional data packets over any of the one or more network connections to determine or measure performance metrics of the respective network connections.

3. The method according to claim 1, wherein the networking protocol is transmission control protocol (TCP), and wherein each of the one or more connection metrics determined for the at least one of the one or more network connections is one of a set of TCP-based metrics, including one or more window utilization metrics each over a respective time interval, an average of a one of the window utilization metrics over a respective time interval, a congestion window utilization metric, one or more receive window utilization metrics each over a respective time interval, an average of a one of the receive window utilization metrics over a respective time interval, a time average zero window fraction metric over a respective time interval when the respective network connection has a zero window, an average smoothed round trip time metric over a respective time interval, and an available connection bandwidth metric.

4. The method according to claim 3, wherein the statistics upon which each of the window utilization and average window utilization metrics is based are associated with TCP send window statistics.

5. The method according to claim 3, wherein the statistics upon which each of the window utilization and average window utilization metrics is based include the TCP statistics IN_FLIGHT, CWND, RWND and MSS.

6. The method according to claim 3, wherein the statistics upon which each of the receive window utilization and average receive window utilization metrics is based include the TCP statistics IN_FLIGHT, RWND and MSS.

7. The method according to claim 3, wherein the statistics upon which the time average zero window fraction metric is based are associated with a fraction of time when a TCP receive window is zero over the respective time interval.

8. The method according to claim 3, wherein the statistics upon which the average smoothed round trip time metric is based are associated with an average for smoothed round trip time samples for the respective network connection within the respective time interval.

9. The method according to claim 3, wherein the statistics upon which the available connection bandwidth metric is based are associated with an available bandwidth/data rate.

10. A communications terminal comprising:
    a processor operable to log a plurality of statistics obtained through passive monitoring of standard operational statistics of a networking protocol for each of one or more network connections of a client network; and wherein the communications terminal is operable to perform packet data communications over each network connection with a respective client device over a respective link over the client network using the networking protocol, and to provide access to a wide area data communications network for each client device via the respective network connection over the respective link over the client network, wherein the processor is further operable to determine one or more connection metrics for at least one of the one or more network connections, wherein each connection metric for a particular network connection is determined based on one or more of the logged statistics associated with the particular network connection, wherein the processor is further operable to determine one or more performance conditions with respect to the at least one of the one or more network connections, wherein each performance condition with respect to a particular network connection is determined based on an analysis of a respective one or more of the connection metrics determined for the respective network connection, and wherein the processor is further operable to diagnose a degradation in performance over one of the links over the client network based on the one or more performance conditions determined with respect to at least one of the network connections over the one link.

11. The apparatus according to claim 10, wherein the monitoring of the standard operational statistics of the networking protocol, the determination of the one or more connection metrics for the one or more network connections and the determination of the one or more performance conditions are performed passively without sending any additional data packets over any of the one or more network connections to determine or measure performance metrics of the respective network connections.

12. The communications terminal according to claim 10, wherein the networking protocol is transmission control protocol (TCP), and wherein each of the one or more connection metrics determined for the at least one of the one or more network connections is one of a set of TCP-based metrics, including one or more window utilization metrics each over a respective time interval, an average of a one of the window utilization metrics over a respective time interval, a congestion window utilization metric, one or more receive window utilization metrics each over a respective time interval, an average of a one of the receive window utilization metrics over a respective time interval, a time average zero window fraction metric over a respective time interval when the respective network connection has a zero window, an average smoothed round trip time metric over a respective time interval, and an available connection bandwidth metric.

13. The communications terminal according to claim 12, wherein the statistics upon which each of the window utilization and average window utilization metrics is based are associated with TCP send window statistics.

14. The communications terminal according to claim 12, wherein the statistics upon which each of the window utilization and average window utilization metrics is based include the TCP statistics IN_FLIGHT, CWND, RWND and MSS.

15. The communications terminal according to claim 12, wherein the statistics upon which each of the receive window utilization and average receive window utilization metrics is based include the TCP statistics IN_FLIGHT, RWND and MSS.

16. The communications terminal according to claim 12, wherein the statistics upon which the time average zero window fraction metric is based are associated with a fraction of time when a TCP receive window is zero over the respective time interval.

17. The communications terminal according to claim 12, wherein the statistics upon which the average smoothed round trip time metric is based are associated with an average for smoothed round trip time samples for the respective network connection within the respective time interval.

18. The communications terminal according to claim 12, wherein the statistics upon which the available connection bandwidth metric is based are associated with an available bandwidth/data rate.

19. A system comprising:
one or more client devices and a customer premise terminal, wherein the one or more client devices are connected to the customer premise terminal via a client network; and wherein the customer premise terminal is operable to log a plurality of statistics obtained through passive monitoring of standard operational statistics of a networking protocol for each of one or more network connections over the client network, wherein the customer premise terminal is further operable to perform packet data communications over each network connection with a respective one of the client devices over a respective link over the client LAN using the networking protocol, and to provide access to a wide area data communications network for each client device via the respective network connection over the respective link over the client network, wherein the customer premise terminal is further operable to determine one or more connection metrics for at least one of the one or more network connections, wherein each connection metric for a particular network connection is determined based on one or more of the logged statistics associated with the particular network connection, wherein the customer premise terminal is further operable to determine one or more performance conditions with respect to the at least one of the one or more network connections, wherein each performance condition with respect to a particular network connection is determined based on an analysis of a respective one or more of the connection metrics determined for the respective network connection, and wherein the customer premise terminal is further operable to diagnose a degradation in performance over one of the links over the client network based on the one or more performance conditions determined with respect to at least one of the network connections over the one link.

20. The system according to claim 19, wherein the monitoring of the standard operational statistics of the networking protocol, the determination of the one or more connection metrics for the one or more network connections and the determination of the one or more performance conditions are performed passively without sending any additional data packets over any of the one or more network connections to determine or measure performance metrics of the respective network connections.

21. The system according to claim 19, wherein the networking protocol is transmission control protocol (TCP), and wherein each of the one or more connection metrics determined for the at least one of the one or more network connections is one of a set of TCP-based metrics, including one or more window utilization metrics each over a respective time interval, an average of a one of the window utilization metrics over a respective time interval, a congestion window utilization metric, one or more receive window utilization metrics each over a respective time interval, an average of a one of the receive window utilization metrics over a respective time interval, a time average zero window fraction metric over a respective time interval when the respective network connection has a zero window, an average smoothed round trip time metric over a respective time interval, and an available connection bandwidth metric.

* * * * *